(12) United States Patent
Pawar et al.

(10) Patent No.: US 12,699,586 B2
(45) Date of Patent: Aug. 4, 2026

(54) VIRTUAL MACHINE HOSTING AND SERVERLESS DISASTER RECOVERY

(71) Applicant: NetApp Inc., San Jose, CA (US)

(72) Inventors: Dnyaneshwar Nagorao Pawar, Bangalore (IN); Sumith Makam, Kundanahalli (IN); Roopesh Chuggani, Jaipur (IN); Vineeth Kumar Chalil Karinta, Apex, NC (US); Tijin George, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 561 days.

(21) Appl. No.: 18/308,718

(22) Filed: Apr. 28, 2023

(65) Prior Publication Data

US 2024/0362053 A1 Oct. 31, 2024

(51) Int. Cl.
| | |
|---|---|
| *G06F 9/455* | (2018.01) |
| *G06F 8/61* | (2018.01) |
| *G06F 11/1446* | (2026.01) |

(52) U.S. Cl.
CPC ............ *G06F 9/45558* (2013.01); *G06F 8/63* (2013.01); *G06F 11/1451* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,230,195 B2 | 7/2012 | Amarendran et al. | |
| 10,725,885 B1 | 7/2020 | Paraschiv et al. | |
| 10,852,976 B2 | 12/2020 | George et al. | |
| 11,016,943 B2 | 5/2021 | George et al. | |
| 11,036,419 B1 | 6/2021 | Srikantan et al. | |
| 11,099,956 B1 * | 8/2021 | Polimera ............. | G06F 11/2069 |
| 11,144,498 B2 | 10/2021 | George et al. | |
| 11,188,500 B2 | 11/2021 | Kushwah et al. | |
| 2008/0189700 A1 * | 8/2008 | Schmidt .................. | G06F 9/455 |
| | | | 718/1 |
| 2013/0346803 A1 * | 12/2013 | Chiruvolu ........... | G06F 11/3688 |
| | | | 714/37 |
| 2015/0341221 A1 | 11/2015 | Vatnikov et al. | |
| 2015/0373093 A1 | 12/2015 | Ashok et al. | |

(Continued)

OTHER PUBLICATIONS

Non-Final Office Action mailed on Oct. 22, 2025 for U.S. Appl. No. 18/308,720, filed Apr. 28, 2023, 34 pages.

(Continued)

*Primary Examiner* — Wynuel S Aquino
(74) *Attorney, Agent, or Firm* — Cooper Legal Group, LLC

(57) ABSTRACT

Techniques are provided for virtual machine hosting and serverless disaster recovery. A virtual machine is hosted by a first hypervisor that may be located on-premise. Snapshots of virtual machine disks of the virtual machine are backed up to a cloud storage environment. The snapshots are used to on-demand host a new instance of the virtual machine within a destination environment such as within the cloud storage environment through a second hypervisor. The new instance of the virtual machine is hosted for various reasons such as part of a disaster recovery operation if the virtual machine fails, load balancing of I/O operations, migration to a different hosting environment (e.g., a cheaper or more performant environment), development testing, etc.

20 Claims, 15 Drawing Sheets

(56) References Cited

U.S. PATENT DOCUMENTS

| 2016/0335007 | A1 | 11/2016 | Ryu et al. |
| 2018/0173554 | A1 | 6/2018 | Caradonna et al. |
| 2019/0102256 | A1* | 4/2019 | Murphy ................ G06F 16/219 |
| 2019/0188024 | A1* | 6/2019 | Liu ......................... G06F 9/455 |
| 2019/0340003 | A1 | 11/2019 | Ramanathan et al. |
| 2020/0285611 | A1 | 9/2020 | George et al. |
| 2020/0285613 | A1 | 9/2020 | George et al. |
| 2020/0285614 | A1 | 9/2020 | George et al. |
| 2020/0314175 | A1 | 10/2020 | Dailianas et al. |
| 2020/0334061 | A1 | 10/2020 | Zlotnick et al. |
| 2020/0409803 | A1 | 12/2020 | Naidu et al. |
| 2022/0100618 | A1* | 3/2022 | Jain ..................... G06F 11/1662 |
| 2022/0245033 | A1* | 8/2022 | Zou ..................... G06F 11/1464 |
| 2022/0357853 | A1* | 11/2022 | Bar Shalom ............ G06F 3/067 |
| 2022/0374519 | A1* | 11/2022 | Botelho .............. G06F 11/1464 |
| 2023/0056425 | A1* | 2/2023 | Gopalapura Venkatesh ................ G06F 16/164 |
| 2023/0109510 | A1* | 4/2023 | Polimera ............. G06F 11/2094 714/6.3 |
| 2023/0222041 | A1 | 7/2023 | Muniraju et al. |
| 2023/0315503 | A1 | 10/2023 | Lu et al. |
| 2024/0012667 | A1* | 1/2024 | Mohanty .............. G06F 9/5077 |
| 2024/0362054 | A1 | 10/2024 | Pawar et al. |

OTHER PUBLICATIONS

Final Office Action mailed on Apr. 1, 2026 for U.S. Appl. No. 18/308,720, filed Apr. 28, 2023, 36 pages.

* cited by examiner

300 —

300 —

300

301

COMPUTING ENVIRONMENT

104

FIRST HYPERVISOR

106

PRIMARY VIRTUAL MACHINE

108

PRIMARY VIRTUAL MACHINE DISKS (BOOT) (DATA)

110

CLOUD STORAGE ENVIRONMENT

112

STORAGE BUCKET

114

SNAPSHOTS OF PRIMARY VIRTUAL MACHINE

INCREMENTAL SNAPSHOTS

313

BACKUP

116

107

SECOND HYPERVISOR

DESTINATION VIRTUAL MACHINE iSCSI SESSION

LUN

310

312

314

300

301

COMPUTING ENVIRONMENT

104

FIRST HYPERVISOR

106

PRIMARY VIRTUAL MACHINE

108

PRIMARY VIRTUAL MACHINE DISKS (BOOT) (DATA)

320

FAILBACK PROCEDURE

110

CLOUD STORAGE ENVIRONMENT

112

STORAGE BUCKET

114

SNAPSHOTS OF PRIMARY VIRTUAL MACHINE

INCREMENTAL SNAPSHOTS

116

107

SECOND HYPERVISOR

DESTINATION VIRTUAL MACHINE iSCSI SESSION

LUN

310

312

314

Figure 4:
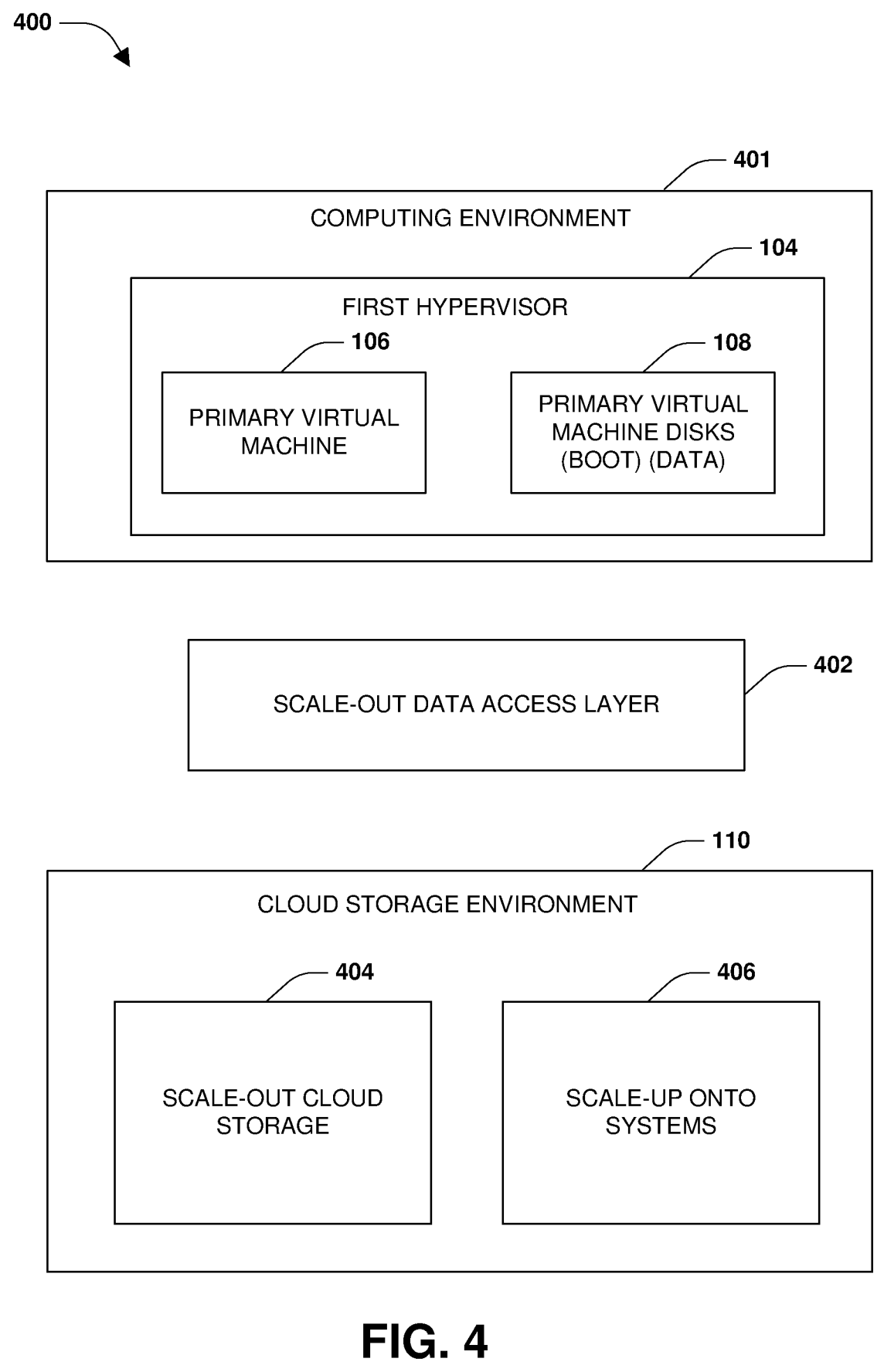

400

401

COMPUTING ENVIRONMENT

104

FIRST HYPERVISOR

106

PRIMARY VIRTUAL MACHINE

108

PRIMARY VIRTUAL MACHINE DISKS (BOOT) (DATA)

402

SCALE-OUT DATA ACCESS LAYER

110

CLOUD STORAGE ENVIRONMENT

404

SCALE-OUT CLOUD STORAGE

406

SCALE-UP ONTO SYSTEMS

Figure 5:
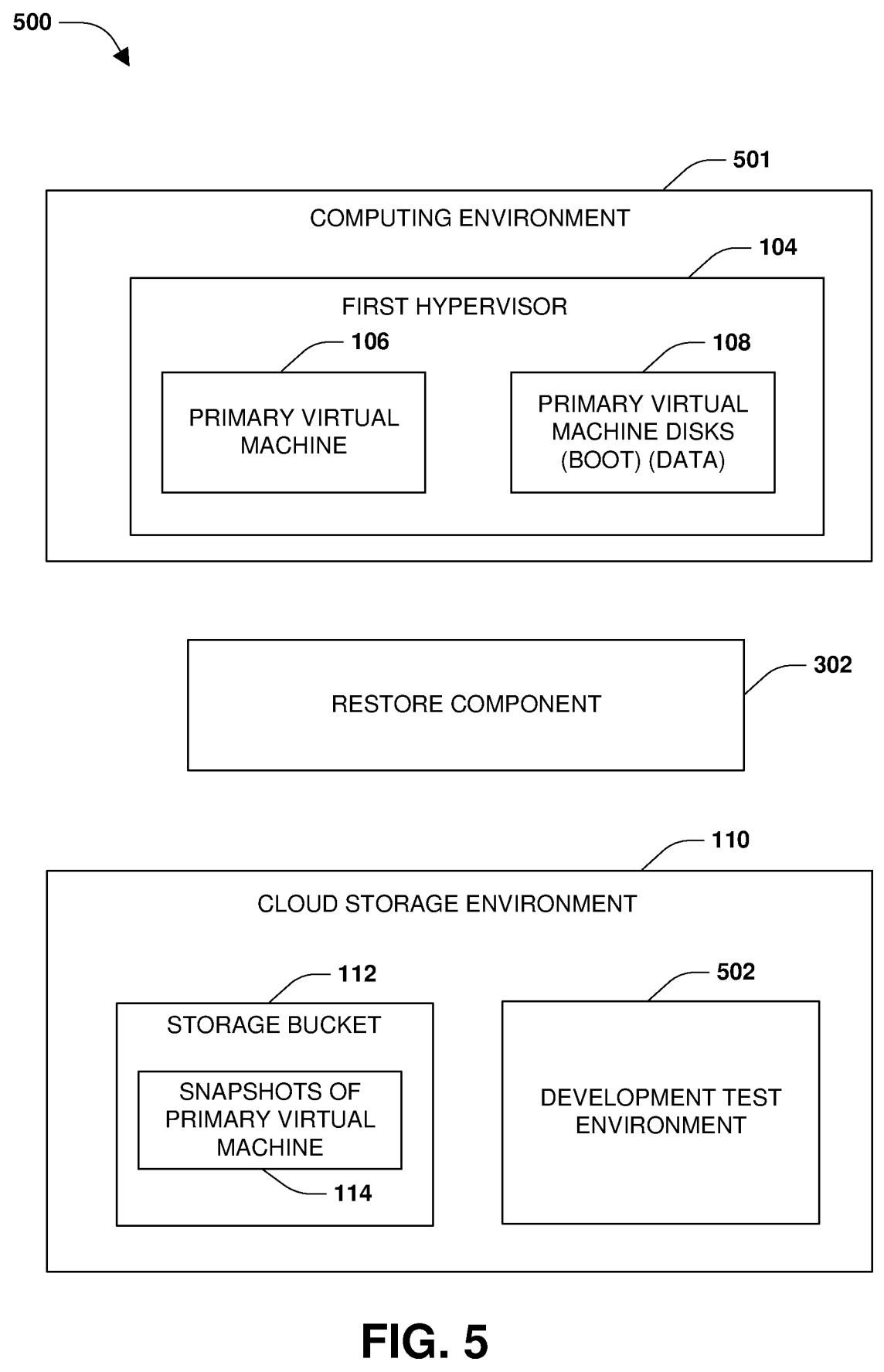

COMPUTING ENVIRONMENT

104

FIRST HYPERVISOR

106

PRIMARY VIRTUAL MACHINE

108

PRIMARY VIRTUAL MACHINE DISKS (BOOT) (DATA)

302

RESTORE COMPONENT

110

CLOUD STORAGE ENVIRONMENT

112

STORAGE BUCKET

SNAPSHOTS OF PRIMARY VIRTUAL MACHINE

114

502

DEVELOPMENT TEST ENVIRONMENT

Figure 6:
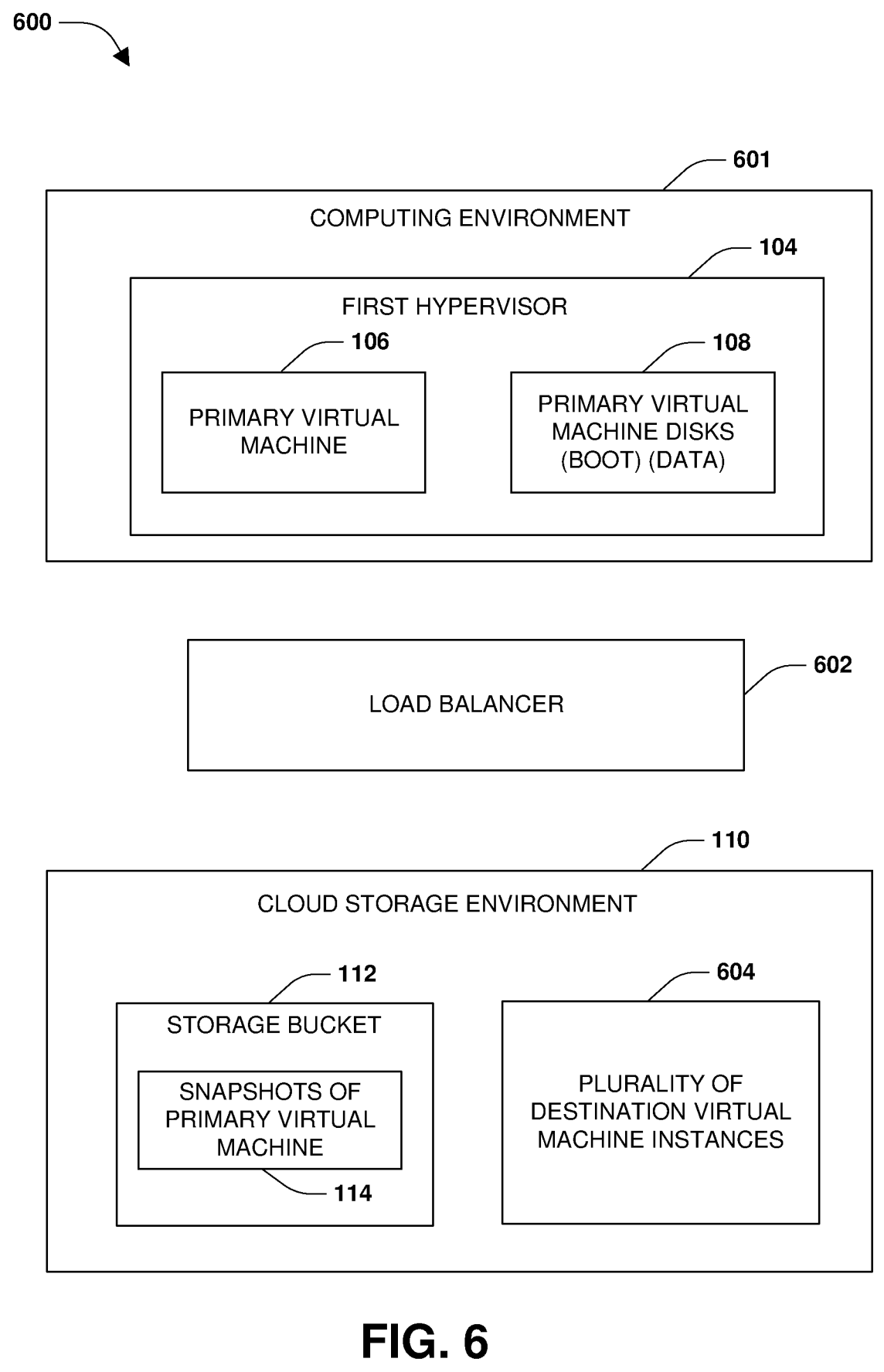

COMPUTING ENVIRONMENT

104

FIRST HYPERVISOR

106

PRIMARY VIRTUAL MACHINE

108

PRIMARY VIRTUAL MACHINE DISKS (BOOT) (DATA)

602

LOAD BALANCER

110

CLOUD STORAGE ENVIRONMENT

112

STORAGE BUCKET

SNAPSHOTS OF PRIMARY VIRTUAL MACHINE

114

604

PLURALITY OF DESTINATION VIRTUAL MACHINE INSTANCES

COMPUTER
INSTRUCTIONS

906

010110100010101
0101011010101
101101011100...

908

COMPUTER READABLE
MEDIUM

VIRTUAL MACHINE HOSTING AND SERVERLESS DISASTER RECOVERY

BACKGROUND

A virtual machine provides clients with access to client data, applications, and other services. A hypervisor (or a virtual machine monitor layer) boots and executes the virtual machine. The hypervisor boots the virtual machine using a boot virtual machine disk. The virtual machine stores client data within data virtual machine disks. Snapshot functionality is used to create a point in time representation (i.e., snapshots) of the virtual machine including the boot virtual machine disk and the data virtual machine disks. The snapshots are backed up to a cloud storage environment.

DESCRIPTION OF THE DRAWINGS

FIG. 4 is a block diagram illustrating an example system for restoring a primary virtual machine as scale-up onto systems in accordance with an embodiment of the present technology.

FIG. 5 is a block diagram illustrating an example system for restoring a primary virtual machine as a destination virtual machine for development testing in accordance with an embodiment of the present technology.

FIG. 6 is a block diagram illustrating an example system for restoring a primary virtual machine as a plurality of destination virtual machines for load balancing in accordance with an embodiment of the present technology.

DETAILED DESCRIPTION

Figure 1:
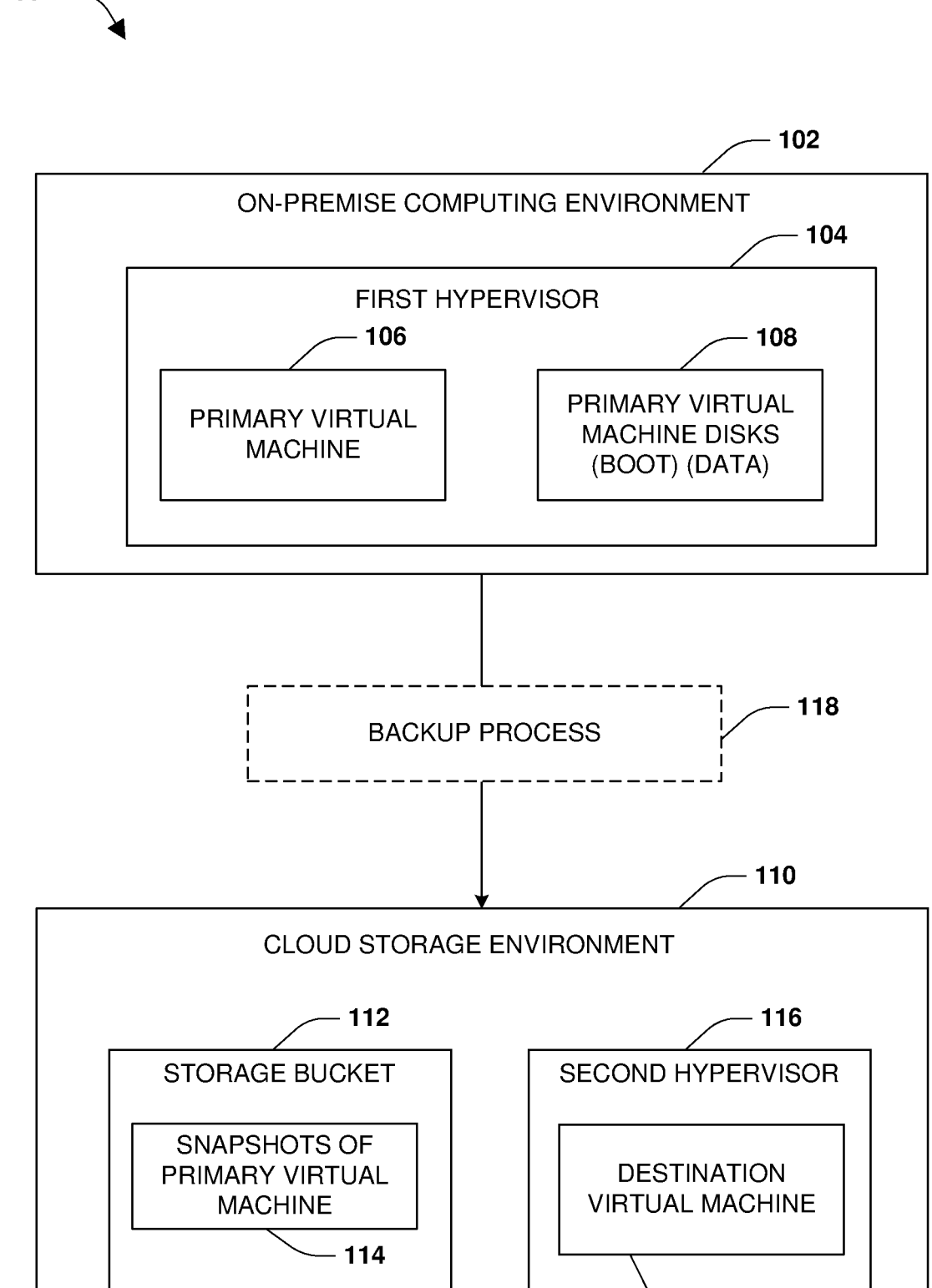
FIG. 1 is a block diagram illustrating an example system for backing up snapshots of a primary virtual machine to a cloud storage environment in accordance with an embodiment of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

The techniques described herein are directed to restoring a primary virtual machine as a destination virtual machine. Many users/client systems back up primary volumes from on-premise computing sites to cloud storage environments that provide scaleable, long term, low cost storage. Snapshots of a volume are created and backed up as objects into an object store of a cloud storage environment such as into a storage bucket. A snapshot of the volume captures virtual machine disks, of a primary virtual machine, stored within the volume. On-demand restore technology and cloud volume technology allows a user to restore the volume from the snapshots on-demand into an on-demand volume, which can be used to restore the primary virtual machine. The user is provided with instant access to the on-demand volume once the on-demand restore is initiated, as opposed to a full volume restore where client access is provided only after the entire volume is restored from the snapshots. As the user requests certain blocks of data, those blocks are restored on-demand from the cloud storage environment to the on-demand volume for access by the client. A background restore process is performed to copy over blocks of data from the snapshots in the cloud storage environment to the on-demand volume until the on-demand restore process completes.

The virtual machines are typically used to host applications and services on-premise. These virtual machines are referred to as primary virtual machines through which a user can actively access applications, services, and client data. These primary virtual machines are hosted and formatted according to a particular format supported by a primary virtual machine hosting environment (e.g., VMWare, Microsoft and others (without derogation of any third party trademark rights). Virtual machine disks (VMDKs) of a primary virtual machine are stored as files within a volume. Snapshots of the volume capture the virtual machine disks, and are backed up to the storage bucket of the cloud storage environment. However, these snapshots cannot be used to restore the virtual machine disks to a destination virtual machine hosted and formatted according to a different format supported by a different virtual machine hosting environment (e.g., virtual machines hosted within the cloud storage environment through EC2 instances (provided by Amazon Web Services (AWS) (without derogation of any third party trademark rights)). Thus, users are unable to restore virtual machines to other virtual machine hosting environments that could otherwise be leveraged to reduce cost, perform disaster recovery, increase performance, and/or utilize other characteristics of different virtual machine hosting environments.

Accordingly, as provided herein, the snapshots backed up to the cloud storage environment are used to on-demand create and host destination virtual machines for serverless disaster recovery, load balancing, hosting a development test environment, scaling out with scale-up onto systems, and/or migrating a virtual machine to a different virtual machine hosting environment that could be more performant, provide reduce storage cost, etc. Serverless disaster recovery corresponds to the ability to perform disaster recovery where there is no disaster recovery server being maintained during normal operation (which provides for reduced operating costs), and a destination virtual machine is created on-demand merely when there is a disaster recovery event and is deleted/deconstructed after the disaster recovery event. The innovative aspects of the present disclosure leverage on-demand restore and cloud volumes (e.g., the ability to host volumes within a cloud storage environment) in order to provide an improved virtual machine disaster recovery technique that provides users with the ability to back up virtual machines (e.g., a primary virtual machine hosted on-premise) to the cloud storage environment, and then restore the virtual machines on-demand for disaster recovery, development testing, load balancing, and scaling to a destination virtual machine hosting environment. The destination virtual machine hosting environment can be the same or a different environment than the primary virtual machine hosting environment (e.g., a virtual machine hosted through an EC2 instance).

Providing users with the ability to back up virtual machines to the cloud storage environment, and then restore those virtual machines from the cloud storage environment on-demand to the cloud storage environment or a different virtual machine hosting environment enables users to restore the virtual machines to lower cost hosting environments (e.g., a cloud based virtual machine hosting environment such as within AWS or any other environment) so that users are not locked into using the same virtual machine hosting environment (e.g., provided by VMWare) that may be more expensive. Even though the lower cost virtual machine hosting environments could be less performant than the on-premise virtual machine hosting environment used to host the primary virtual machine, various cloud integrated use cases can leverage this innovation such as for disaster recovery and development testing where virtual machines are restored on-demand such as to a cloud based virtual machine hosting environment. In this way, the adaptive aspects of the present disclosure provide serverless cloud based virtual machine disaster recovery between different virtual machine hosting environments, along with load balancing, development testing, scale out, and migration of virtual machines such as to a lower cost or a more performant destination virtual machine hosting environment FIG. 1 is a block diagram illustrating an example system 100 for backing up snapshots of a primary virtual machine 106 to a cloud storage environment 110. A first hypervisor 104 is hosted at an on-premise computing environment 102. The first hypervisor 104 hosts the primary virtual machine 106, and there is a cost associated with hosting the primary virtual machine 106. Also, a certain amount of performance and resources are provided to the primary virtual machine 106. The primary virtual machine 106 stores data within primary virtual machine disks 108, such as a boot virtual machine disk used by the first hypervisor 104 to boot the primary virtual machine 106 and data virtual machine disks within which client data, applications, services, and/or other data is stored.

Backups of the primary virtual machine 106 are created by taking snapshots 114 of the primary virtual machine disks 108. For example, the snapshots 114 are taken of a volume storing the primary virtual machine disks 108. A backup process 118 transmits (or provides access to) the snapshots 114 from the on-premise computing environment 102 into a storage bucket 112 of a cloud storage environment 110 that provides scalable and low cost storage compared to storage of the on-premise computing environment 102. In some embodiments, the backup process 118 is implemented by a copy to cloud service that stores snapshot data into objects formatted according to an object format and accessible through a snapshot file system and stores the objects within storage buckets of an object store, which is further described in relation to FIGS. 7A-7C. The snapshots 114 can be used to restore the primary virtual machine 106 as a destination virtual machine 107 hosted within a destination virtual machine hosting environment. The destination virtual machine hosting environment could be hosted within the cloud storage environment 110 or hosted within a different computing environment (e.g., hosted within the on-premise computing environment 102 or other computing environment). The destination virtual machine hosting environment has a second hypervisor 116 that can host the destination virtual machine 107 that will be restored using the snapshots 114 within the storage bucket 112. The second hypervisor 116 may be the same type of hypervisor as the first hypervisor 104 (e.g., both hypervisors are VMWare or some other type of hypervisor) or is a different type of hypervisor than the first hypervisor 104 and thus supports a different format of virtual machine disks than the first hypervisor 104.

In this way, the snapshots 114 are used to create and host a serverless instance of the destination virtual machine 107 on-demand such as to provide disaster recovery in response to the primary virtual machine 106 failing. The serverless instance of the destination virtual machine 107 is hosted using a container, a serverless thread, an EC2 instance, a compute instance, or some other compute created on-demand such as in response to the primary virtual machine 106 failing. In some embodiments, a service (e.g., a disaster recovery as a service (DRaaS) business logic service) is implemented within a unified control plane (e.g., a hybrid cloud storage and data service architecture) to monitor endpoints (e.g., on-premise endpoints and/or cloud environments where virtual machines and/or volumes may be hosted) and to orchestrate disaster recovery workflows for the endpoints. Serverless virtual machine disaster recovery reduces the cost of performing disaster recovery because a disaster recovery server is not maintained during normal operation before the primary virtual machine 106 has failed. This reduces or eliminates the cost of maintaining server hardware and compute resources because the destination virtual machine 107 is on-demand created only when needed and is then deleted when no longer needed.

In some embodiments of performing serverless disaster recovery, a user creates a disaster recovery plan, and attaches the primary virtual machine 106 to the disaster recovery plan. The disaster recovery plan specifies a destination virtual machine hosting environment and/or triggers for when to implement disaster recovery for on-demand creation a serverless instance of the destination virtual machine 107. The disaster recovery plan provides instructions to host the destination virtual machine 107 through the second hypervisor 116 of the cloud storage environment 110 in response to the primary virtual machine 106 being unresponsive for a particular timespan. The primary virtual machine 106 has a boot virtual machine disk and data virtual machine disks stored by the first hypervisor 104 as the primary virtual machine disks 108. In some embodiments, the primary virtual machine disks 108 are stored within a volume of the on-premise computing environment 102. The primary virtual machine disks 108 have a certain format that is supported by the first hypervisor 104. This format may or may not be supported by the second hypervisor 116 (e.g., the primary virtual machine disks have a VMDK format or some other format, whereas the second hypervisor 116 supports a different format such as an AMI format, for example). The primary virtual machine 106 is backed up to the cloud storage environment 110 according to the disaster recovery plan. In some embodiments, the disaster recovery plan specifies that snapshots of the primary virtual machine disks 108 are to be created at a particular interval or based upon a triggering event and are then to be backed up into the storage bucket 112 of the cloud storage environment 110 identified by the disaster recovery plan. In some embodiments, snapshot data of these snapshots is stored into objects according to the object format and snapshot file system described in relation to FIGS. 7A-7C and are then stored into an object store of the cloud storage environment 110.

In some embodiments, disaster recovery orchestration is triggered such as based upon a failure of the primary virtual machine 106 (e.g., a loss of a heartbeat, a period of unresponsiveness, etc.). Accordingly, the snapshots 114 are used to access/restore a backup copy of the boot virtual machine disk of the primary virtual machine 106, which is used to dynamically generate, host, and boot a serverless instance of the destination virtual machine 107 on-demand such as through the second hypervisor 116 within the cloud storage environment 110. In some embodiments where a destination format supported by the second hypervisor 116 (a destination virtual machine disk format such as an AMI (Amazon Machine Image) format) is different than a format supported by the first hypervisor 104 (e.g., a virtual machine disk format such as a VMDK format), an import tool is used to convert the boot virtual machine disk to the destination format supported by the second hypervisor 116. For example, the boot virtual machine disk is copied from a snapshot stored within the storage bucket 112 to an Elastic Block Storage (EBS) Volume according to the AMI format (the destination format) using AWS import, or may be copied to any other type of volume such as a storage operating system volume where data disks are exposed as a LUN direct to the storage operating system volume. In some embodiments, if the destination format supported by the second hypervisor 116 is the same as the format supported by the first hypervisor 104, then the boot virtual machine disk is not converted to another virtual machine disk format. In this way, the second hypervisor 116 (hosted within the cloud storage environment 110 or a different computing environment) will subsequently use the boot virtual machine disk to boot the destination virtual machine 107 into an operational state for taking over the processing of client I/O and the hosting of applications and services in place of the failed primary virtual machine 106.

As part of the disaster recovery orchestration, the data virtual machine disks of the primary virtual machine 106 are restored on-demand from the snapshots 114 in the storage bucket 112 to a cloud volume hosted within the cloud storage environment 110. In some embodiments, the data virtual machine disks are converted to a LUN (Logical Unit Number). The LUN is connected to the destination virtual machine 107 using an iSCSI session. The destination virtual machine 107 is hosted as an EC2 instance that uses the iSCSI (internet Small Computer Systems Interface) session to access the LUN. This optional conversion provides faster recovery time objectives (RTOs) where the destination virtual machine 107 can start taking over for the failed primary virtual machine 106 faster. The data virtual machine disks (the LUN) are mounted from the cloud volume for access by the destination virtual machine 107 that is providing disaster recovery in place of the failed primary virtual machine 106.

Once the data virtual machine disks are ready for access by the destination virtual machine 107, the destination virtual machine 107 is booted by the second hypervisor 116 into an operational state (failover operation) for providing clients with access to the data of the data virtual machine disks (the LUN) and for hosting applications and services that were previously being hosted by the failed primary virtual machine 106. During failover operation of the destination virtual machine 107, new incremental snapshots of changes made by the destination virtual machine 107 to the data of the data virtual machine disks (e.g., changes made to the EBS volume exposed as the LUN through the iSCSI session; changes made to a data disk exposed as a LUN direct to a volume such as a storage operating system volume) are created and backed up to the storage bucket 112.

This disaster recovery orchestration can leverage on-demand restore where the snapshots are being restored on-demand to the destination virtual machine 107 (e.g., data of the data virtual machine disks are restored from the snapshots in the storage bucket 112 on-demand to the volume). With on-demand restore, the destination virtual machine 107 is provided with access to the data of the data virtual machine disks (the LUN stored within the volume) while the on-demand restore is still restoring the data.

During failover operation of the destination virtual machine 107, the incremental snapshots (snapshots of the EBS volume or other type of volume hosting the LUN) are created and stored within the storage bucket 112. A failback procedure is performed to provide control back from the destination virtual machine 107 to the primary virtual machine 106. The data virtual machine disks are read from the incremental snapshots in the storage bucket 112. If the boot virtual machine disk was previously converted to a destination format different than the format used by the primary virtual machine 106, then the boot virtual machine disk is converted back from the destination format of the destination virtual machine 107 to the format supported by the first hypervisor 104 (e.g., from the AMI format back to the VMware format) using an export mechanism. The boot virtual machine disk is transmitted back to the on-premise computing environment 102. Once the primary virtual machine 106 is booted (i.e., initialized) by the first hypervisor 104 using the boot virtual machine disk and data of the data virtual machine disks are restored using the incremental snapshots (or on-demand restoration of the data virtual machine disks has been initiated), the primary virtual machine 106 is placed into an operational state and the destination virtual machine 107 can be deleted to conserve resources and cost. The backup relationship from the primary virtual machine 106 to the storage bucket 112 is reestablished for creating and storing snapshots of the primary virtual machine 106 into the storage bucket 112.

Figure 2:
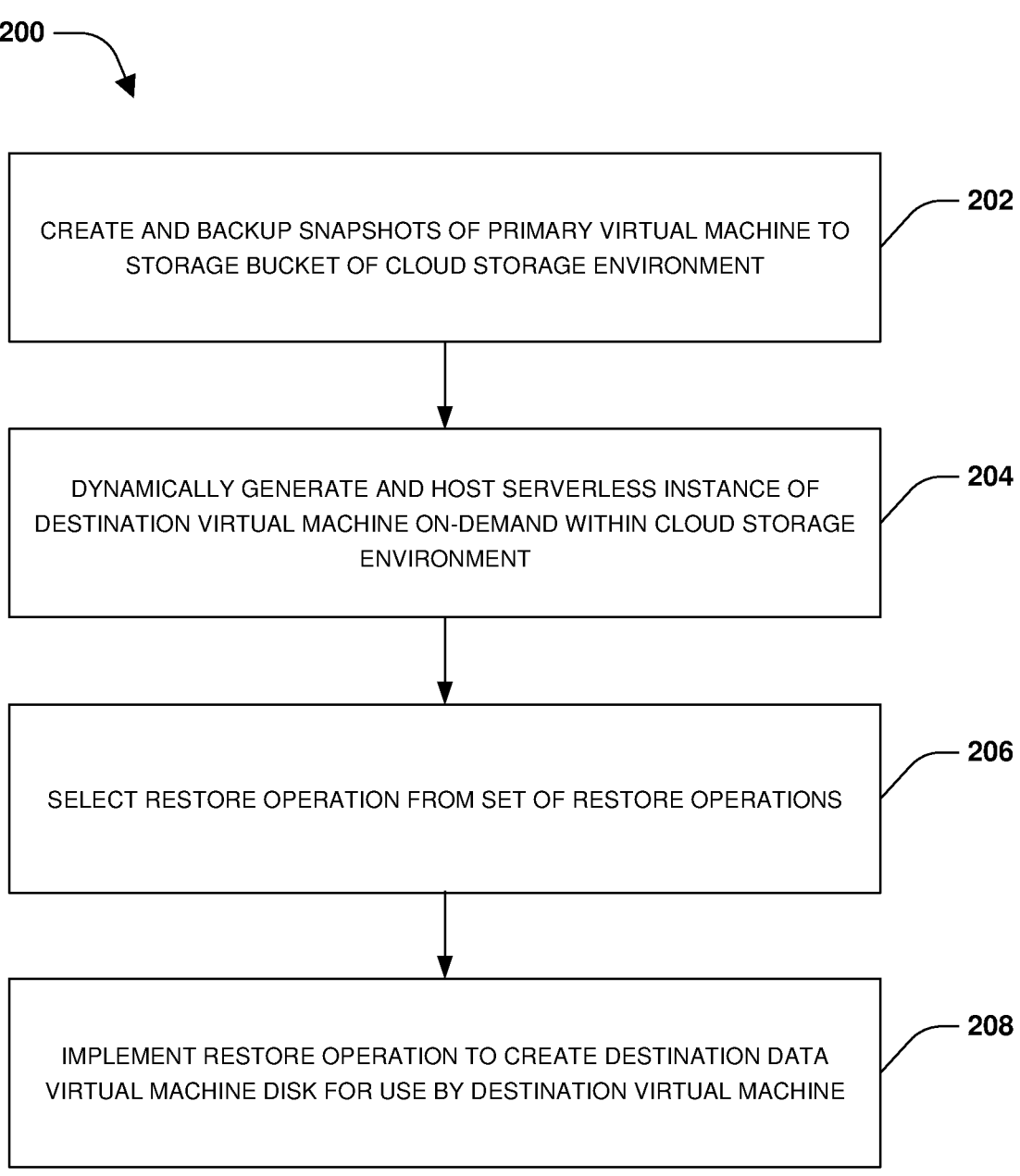
FIG. 2 is a flow chart illustrating an example method for restoring a primary virtual machine as a destination virtual machine in accordance with an embodiment of the present technology.
Figure 3A:
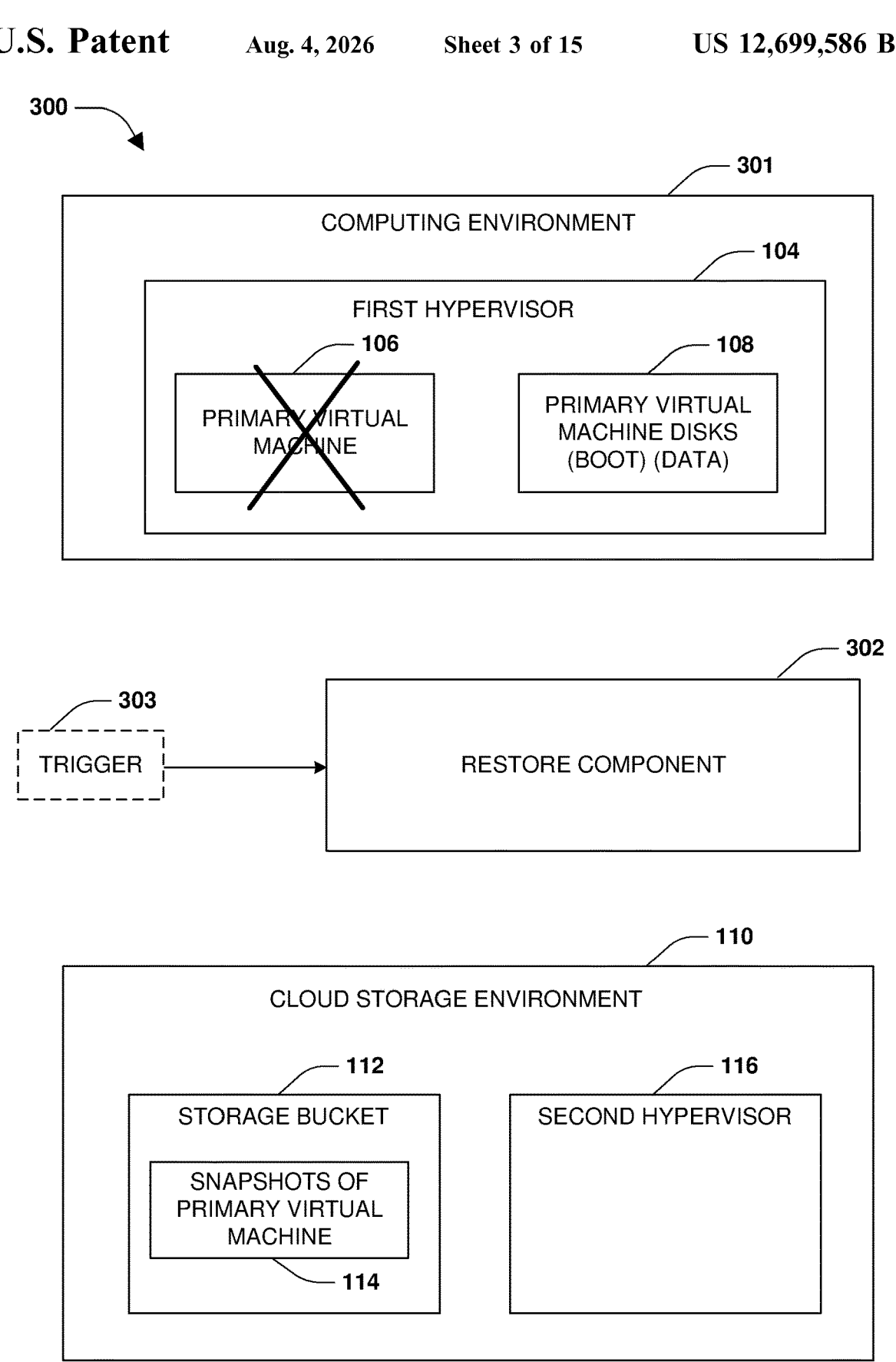
FIG. 3A-3E is a block diagram illustrating an example system for restoring a primary virtual machine as a destination virtual machine in accordance with an embodiment of the present technology.

FIG. 2 is a flow chart illustrating an example method 200 for restoring a primary virtual machine 106 as a destination virtual machine 107, which is further described in conjunction with system 300 of FIGS. 3A-3E. As illustrated by FIG. 3A, the primary virtual machine 106 is hosted by the first hypervisor 104 within a computing environment 301. In some embodiments, the primary virtual machine 106 is hosted on-premise such as by being connected to a local network where client devices accessing the primary virtual machine 106 are connected. The first hypervisor 104 boots (may also be referred to as "initializes") the primary virtual machine 106 using a boot virtual machine disk. The primary virtual machine 106 stores data within a data virtual machine disk(s). The boot virtual machine disk and the data virtual machine disk are stored within the computing environment 301 as primary virtual machine disks 108. During operation 202 of method 200, snapshots of the primary virtual machine disks 108 are created and backed up to the storage bucket 112 of the cloud storage environment 110.

A restore component 302 is hosted within the computing environment 301, the cloud storage environment 110, or a different environment. The restore component 302 is configured to perform serverless disaster recovery, load balancing, scale-out, and development test environment creation using the snapshots 114 backed up to the storage bucket 112 of the cloud storage environment 110. As illustrated by FIG. 3A, the restore component 302 identifies a trigger 303 that causes the restore component 302 to implement an orchestration process. In some embodiments, the trigger 303 relates to a determination that the primary virtual machine 106 has failed, and thus the orchestration process is implemented as a disaster recovery orchestration process.

Figure 3B:
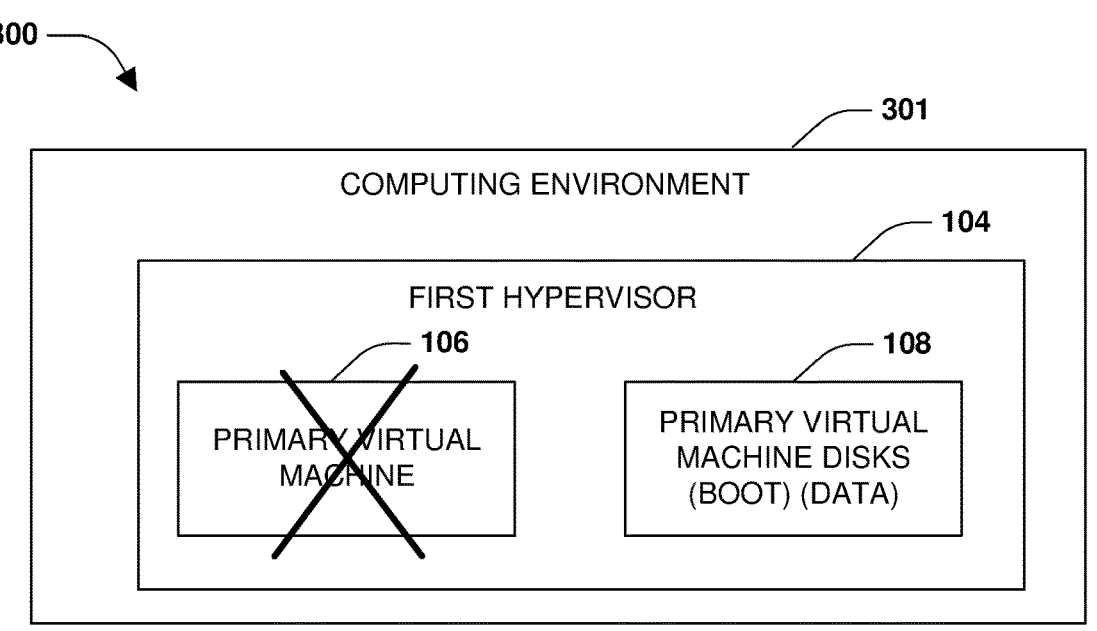
Figure 3B:
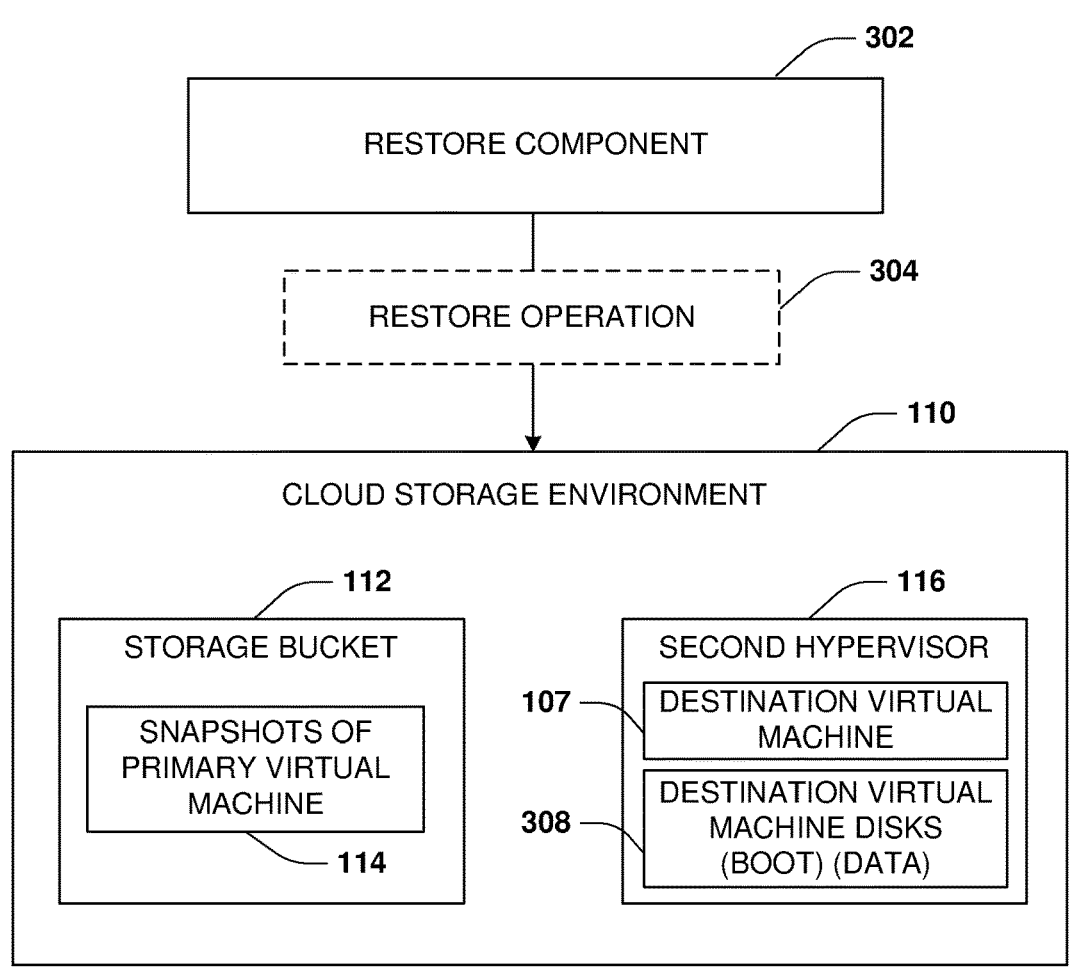

As part of implementing the orchestration process, the restore component 302 transmits instructions to the cloud storage environment 110 to generate and host a serverless instance of the destination virtual machine 107 on-demand through the second hypervisor 116 of the cloud storage environment 110 using the boot virtual machine disk captured by one or more of the snapshots 114 stored within the storage bucket 112, during operation 204 of method 200, as illustrated by FIG. 3B. In this way, the second hypervisor 116 will boot the destination virtual machine 107 using the boot virtual machine disk restored from a snapshot in the storage bucket 112. If the boot virtual machine disk is not in a virtual machine disk format supported by the second hypervisor 116, then the boot virtual machine disk is reformatted/converted to the virtual machine disk format supported by the second hypervisor 116.

During operation 206 of method 200, a restore operation 304 is selected for restoring data virtual machine disks of the primary virtual machine 106 using the snapshots 114 to create destination data virtual machine disks for use by the destination virtual machine 107. The destination data virtual machine disks and the boot virtual machine disk are restored within the cloud storage environment 110 as destination virtual machine disks 308. In some embodiments, the restore operation 304 is selected from a set of restore operations that include a directory restore operation that restores one or more select directories, a full volume restore operation that restores an entire volume that is accessible once the full volume restore operation completes, an on-demand restore operation where an on-demand volume is created and immediately available while data is being restored to the on-demand volume such as through a background process, etc. In some embodiments of processing operations during the on-demand restore operation, an operation targeting already restored data is accessed through the on-demand volume and an operation targeting not yet restored data is retrieved from a snapshot and is stored into the on-demand volume for access by the operation.

In some embodiments, the restore operation 304 (FIG. 3B) is selected based upon a destination performance profile and/or an acceptable client delay. The destination performance profile relates to access, storage, and processing speeds of the cloud storage environment 110 and/or the second hypervisor 116, which correlates to how quickly a particular restore operation can be completed. If an evaluation of the destination performance profile indicates that a full restore operation will take a long time (e.g., longer than an acceptable restore timespan defined by an RTO), then the on-demand restore operation is selected so that the destination virtual machine 107 can access the on-demand volume (where the destination data virtual disk will be restored from the snapshots 114) before the on-demand restore operation completes. This reduces client downtime and RTOs. Otherwise, the full restore operation is performed if the destination performance profile indicates that the full restore operation will complete quickly (e.g., within the acceptable restore timespan defined by the RTO). Similarly, if the full restore operation can complete within the acceptable client delay, then the full restore operation is selected. Otherwise, the on-demand restore operation is selected.

Figure 3C:
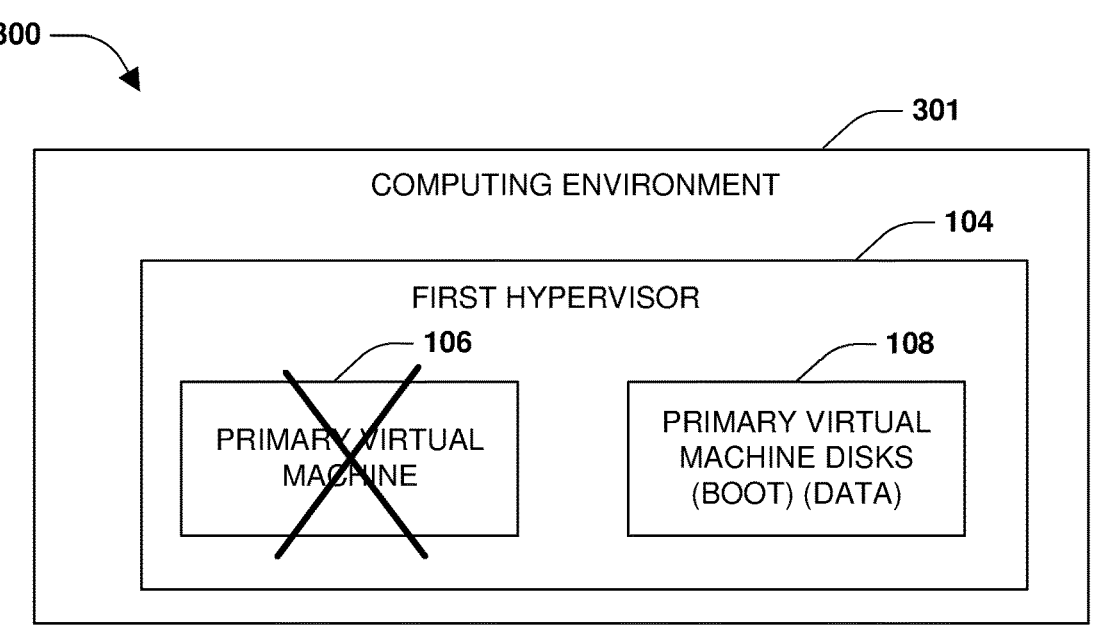
Figure 3C:
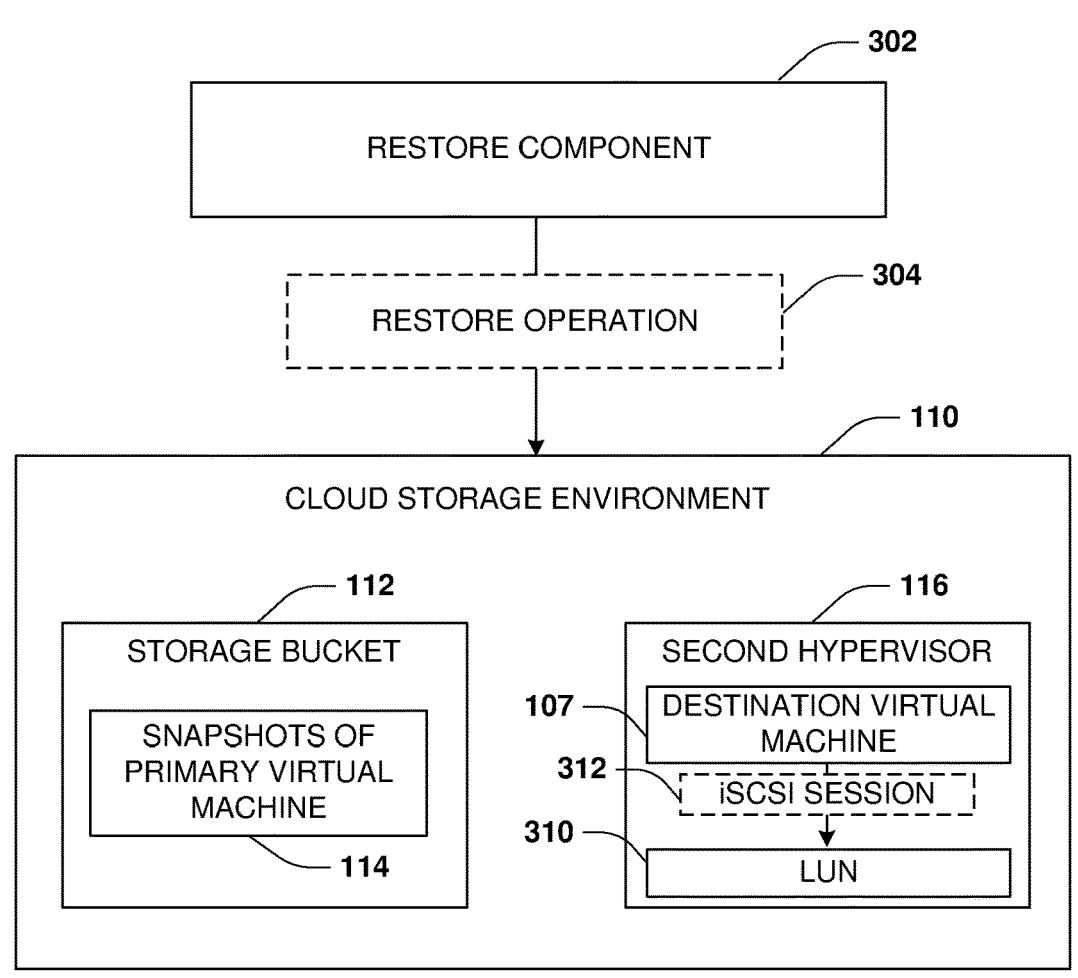

During operation 208 of method 200, the restore operation 304 is implemented to utilize one or more of the snapshots 114 in the storage bucket 112 to create the destination data virtual machine disk(s) for use by the destination virtual machine 107. The destination data virtual machine disk is created within a cloud volume hosted by the cloud storage environment 110 using the selected restore operation 304 (e.g., a full volume restore, an on-demand restore, etc.), and thus the destination data virtual machine disk is mounted from the cloud volume hosted within the cloud storage environment 110 for access by the destination virtual machine 107. The one or more snapshots 114 are converted from a backup format, used by a cloud backup process to back up the snapshots 114 into the storage bucket 112 using an object format and snapshot file system further described in relation to FIGS. 7A-7C, to a virtual machine disk format supported by the second hypervisor 116 hosting the destination virtual machine 107. In some embodiments, the destination data virtual machine disk is converted into a LUN 310, as illustrated by FIG. 3C. The LUN 310 is connected to the destination virtual machine 107 using an iSCSI session 312. Once the destination data virtual machine disk is accessible to the destination virtual machine 107, the destination boot virtual machine disk is used by the second hypervisor 116 to boot the destination virtual machine 107 in to an operational state for providing clients with access to data within the destination data virtual machine disk and for hosting applications and services previously hosted by the primary virtual machine 106.

In some embodiments of performing the restore operation 304, the restore operation 304 is implemented as an on-demand restore operation. In particular, an on-demand volume is created so that data of the data virtual machine disk captured by the snapshots 114 can be restored into the on-demand volume as the destination data virtual machine disk. The destination virtual machine 107 is provided with access to the on-demand volume before the data of the data virtual machine disk captured by the snapshots 114 has been fully restored. Before the on-demand restore operation has completed, an operation targeting the destination data virtual machine disk is received. If the operation targets data already restored to the on-demand volume, then the operation is executed upon the already restored data within the on-demand volume. If the operation targets data not yet restored to the on-demand volume, then the data is on-demand retrieved from the snapshots 114 and is restored to the on-demand volume so that the operation can be executed upon the destination data virtual machine disk.

Figure 3D:
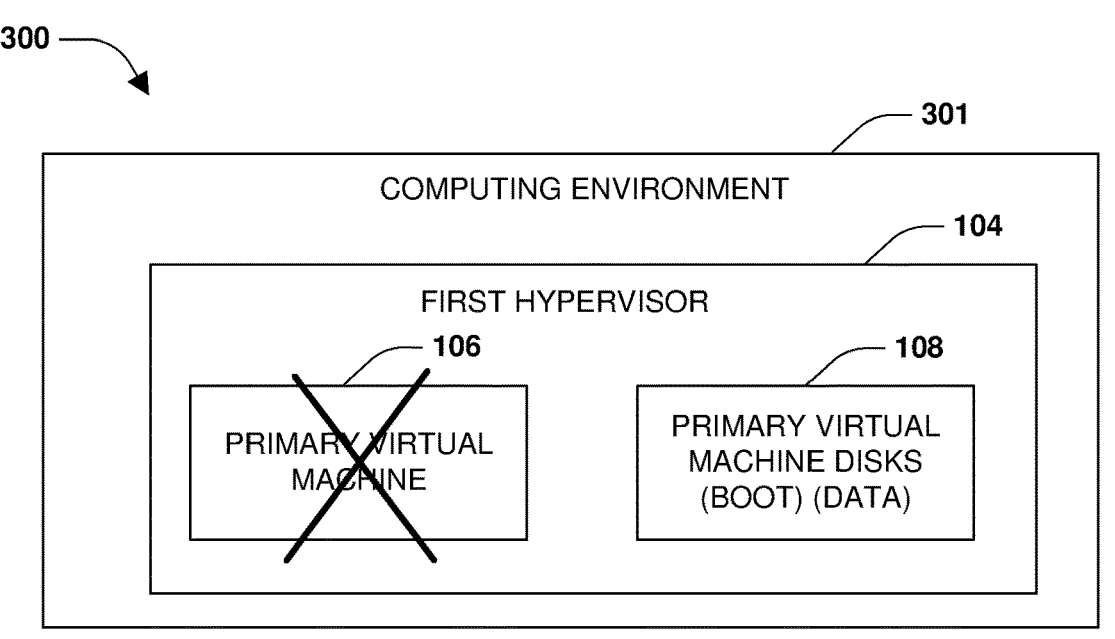
Figure 3D:
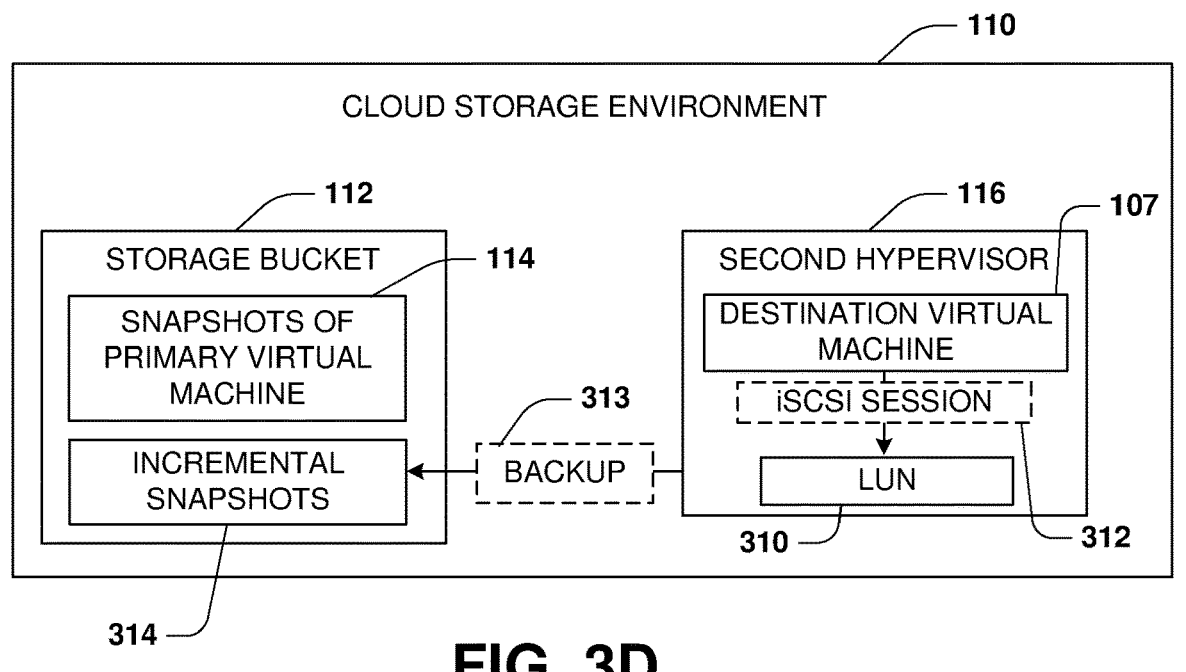

During a failover operation where the destination virtual machine 107 is processing client I/O operations and hosting applications and services in place of the failed primary virtual machine 106, incremental snapshots 314 are created and backed up 313 to the storage bucket 112, as illustrated by FIG. 3D. The incremental snapshots 314 capture changes made to the destination data virtual machine disk by the destination virtual machine 107. The incremental snapshots 314 can be used to synchronize the changes made by the destination virtual machine 107 during failover operation back to the primary virtual machine 106 as part of a failback procedure.

Figure 3E:
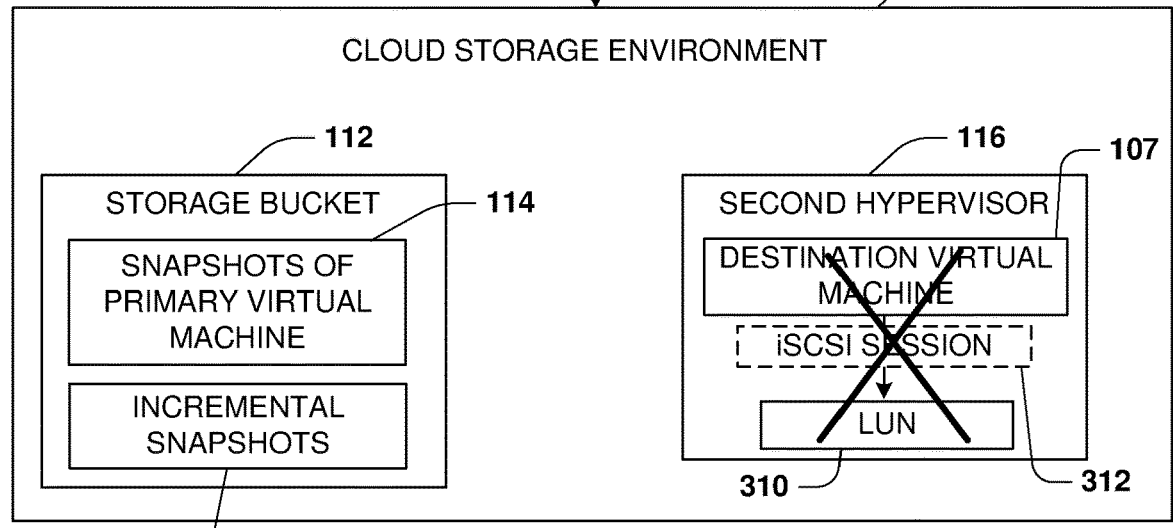

In some embodiments, a failback procedure 320 for the primary virtual machine 106 is initiated, as illustrated by FIG. 3E. In some embodiments, the failback procedure 320 is implemented in response to a determination that the primary virtual machine 106 has recovered and can be in an operational state (e.g., a failure of the computing environment 301 that cause the primary virtual machine 106 to fail has been resolved). Accordingly, the failback procedure 320 uses the incremental snapshots 314, capturing changes made to the destination data virtual machine disk by the destination virtual machine 107, to update the primary virtual machine disks 108 as restored virtual machine disks for use by the recovered primary virtual machine 106 (or a new instance of the primary virtual machine 106). Once the primary virtual machine disks 108 are restored by the failback procedure 320 using the incremental snapshots 314, the primary virtual machine 106 is booted by the first hypervisor 104 into an operational state using a restore boot virtual machine disk for providing clients with access to data within a restore data virtual machine disk. Once the primary virtual machine 106 is operational, the destination virtual machine 107 and destination virtual machine disks are deleted to free resources (e.g., free resources of the cloud storage environment 110 used to host the destination virtual machine 107 and store destination virtual machine disks) and reduce cost. In this way, the destination virtual machine 107 was implemented as a serverless instance that is merely maintained during a disaster recovery event. Additionally, a backup relationship from the primary virtual machine 106 to the storage bucket 112 for creating and backing up snapshots of the primary virtual machine 106 to the storage bucket 112 is reestablished.

FIG. 4 is a block diagram illustrating an example system 400 for restoring a primary virtual machine 106 as scale-up onto systems 406. Scale-out is a model that utilizes multiple resources (e.g., multiple processors or servers) as a computing entity so that a workload of the computing entity can be spread out across the multiple resources. Scale-up is where additional resources such as memory and processing power are added to a server in order to scale up workload capacity of the server. The primary virtual machine 106 is hosted within a computing environment 401. The first hypervisor 104 boots the primary virtual machine 106 using a boot virtual machine disk. The primary virtual machine 106 stores data within a data virtual machine disk(s). The boot virtual machine disk and the data virtual machine disk are stored within the computing environment 401 as primary virtual machine disks 108. Snapshots of the primary virtual machine disks 108 are created and backed up to the cloud storage environment 110.

A scale-out data access layer 402 is provided in order to scale out instances of the primary virtual machine 106 as the scale-up onto systems 406. The scale-out onto systems 406 are serverless instances, containers, or other compute instances used to host additional instances of the primary virtual machine 106 on-demand on an as needed basis (e.g., instances are dynamically created and destroyed/deleted on-demand over time based upon ever changing demand/load). The scale-out onto systems 406 are created using the snapshots backed up to the cloud storage environment 110. The scale-out onto systems 406 utilize scale-out cloud storage 404 such as to store virtual machine disks used by the additional instances of the primary virtual machine 106 hosted by the scale-up onto systems 406. In this way, the scale-out data access layer 402 provides a scale out approach to scale storage provided by virtual machines using the scale-out cloud storage 404 and to scale the number of primary virtual machines 106 using the scale-up onto systems 406 for processing client I/O and hosting application and services. Any number of destination virtual machines can be scaled out through the scale-up onto systems 406 by the scale-out data access layer 402 in a dynamic manner.

FIG. 5 is a block diagram illustrating an example system 500 for restoring a primary virtual machine 106 as a destination virtual machine for development testing. The primary virtual machine 106 is hosted within a computing environment 501. The first hypervisor 104 boots the primary virtual machine 106 using a boot virtual machine disk. The primary virtual machine 106 stores data within a data virtual machine disk. The boot virtual machine disk and the data virtual machine disk are stored within the computing environment 501 as primary virtual machine disks 108. Snapshots 114 of the primary virtual machine disks 108 are created and backed up to the storage bucket within the cloud storage environment 110.

The restore component 302 receives a request to create a development test environment 502 from a user so that the user can host applications, services, and/or modify data within the development test environment 502 without affect the primary virtual machine 106 and data of the primary virtual machine disks 108. In this way, the restore component 302 uses the techniques described herein to restore the snapshots 114 within the storage bucket 112 to host a destination virtual machine within the development test environment 502 so that the user can interact with the destination virtual machine without modifying the primary virtual machine 106 and data of the primary virtual machine disks 108. In this way, development testing access is provided to the destination virtual machine hosted within the development test environment 502 of the cloud storage environment 110.

FIG. 6 is a block diagram illustrating an example system 600 for restoring a primary virtual machine 106 as a plurality of destination virtual machines for load balancing. The primary virtual machine 106 is hosted within a computing environment 601. The first hypervisor 104 boots the primary virtual machine 106 using a boot virtual machine disk. The primary virtual machine 106 stores data within a data virtual machine disk. The boot virtual machine disk and the data virtual machine disk are stored within the computing environment 601 as primary virtual machine disks 108. Snapshots 114 of the primary virtual machine disks 108 are created and backed up to the storage bucket within the cloud storage environment 110.

A load balancer 602 is implemented for balancing operations, such as read operations, across instances of the primary virtual machine 106. The load balancer 602 dynamically monitors and tracks a current workload for the primary virtual machine 106. As the current workload changes, the load balancer 602 uses the techniques described herein to scale up or down (i.e., increase or decrease) a plurality of destination virtual machine instances 604 created on-demand using the snapshots 114 stored within the storage bucket 112. The plurality of destination virtual machine instances 604 are serverless instances of the primary virtual machine 106 (e.g., serverless threads, virtual machines, containers, compute instances, EC2 instances, AWS compute, etc.) created using the snapshots 114. In this way, the load balancer 602 distributes the operations amongst the primary virtual machine 106 and the plurality of destination virtual machine instances 604 for improved performance, reduced latency, and bottleneck avoidance.

In some embodiments, a virtual machine development test environment is hosted within a cloud environment using an AWS import tool for supporting virtual machine test development use cases in the cloud environment. An on-premise virtual machine is cloned in an AWS compute for test development purposes using VM backups stored within S3 storage (e.g., an object storage bucket used for cloud storage). Virtual machine disks in a VMDK format are converted to an AMI format on-demand or based upon a post backup policy or clone policy. In some embodiments of this technique, a user configures a virtual machine backup to the cloud environment to back up the on-premise virtual machine to the S3 storage. An existing backup within the S3 storage is selected and used to create a clone virtual machine for test development or based on a policy. An orchestrator converts a virtual machine disk in the VMDK format to the AMI format using AWS import APIs. In particular, the virtual machine disk in the VMDK format is converted in the S3 storage to an AMI image in EBS storage or other storage such as a storage operating system volume. An AWS import API (application programming interface) injects correct network drivers into the AMI image to enable seamless EC2 boot. A scale out portal cluster is hosted to run multiple conversions in parallel for multiple virtual machine disks. The instances of the virtual machine created through this technique can be tore down based upon a specific time duration or on-demand.

In some embodiments, disaster recovery using the AWS import tool is provided. This supports use cases such as a disaster recovery based policy where a user can choose an RPO (hourly, daily, weekly), select virtual machine names, cloud VPC/subnet/security groups, and other settings as part of disaster recovery. This technique supports virtual machine disaster recovery in the cloud using backups (snapshots) stored within S3 storage. An AWS import API is used to convert virtual machine disks from the VMDK format to the AMI format after each backup operation of the virtual machine disk to the S3 storage has completed. Data protection in the cloud environment is provided using cloud native backup in the S3 storage and AWS export for failback. In some embodiments of this technique, a user applies a disaster recovery plan to a virtual machine, and VM backups (snapshots) of the virtual machine are created and backed up to the cloud environment. An orchestrator converts the virtual machine disks from the VMDK format to the AMI format using AWS import APIs. In particular, the snapshots capturing the virtual machine disks are converted from a cloud backup format (a copy to cloud format) to a VMDK file in the S3 storage. A new AMI is created from a latest VMDK file after every backup job, and a prior AMI is deleted. Maintaining a latest virtual machine disk backup in the AMI format that can be used during disaster recovery will reduce RTO during failover because the latest virtual machine disk backup in the AMI format is readily available for creating a destination virtual machine to take over for a failed primary virtual machine. During a failover event, a stand by EC2 instance is booted from the AMI (the virtual machine disk in the AMI format). A portal cluster can be scaled out to run destination virtual machines through EC2 instances. In this way, data protection in the cloud environment is provided using cloud native backups in the S3 storage. A failback can be performed in an incremental manner using incremental snapshots of a destination virtual machine. As part of failback, an AWS export API is used to export the destination virtual machine disks, captured in the incremental snapshot, from the AMI format back to the VMDK format for use by the primary virtual machine.

In some embodiments, disaster recovery failover is provided using a cloud storage operating system. A disaster recovery plan is based upon a policy where a user chooses an RPO (hourly, daily, weekly), select virtual machine names, cloud VPC/subnet/security groups, and other settings as part of disaster recovery. The cloud storage operating system is leveraged to enable copy free conversions for data virtual machine disks. In particular, boot virtual machine disks in the VMDK format are converted to the AMI format using AWS import. Data virtual machine disks are restored on-demand to a LUN format without copying data. In some embodiments of this technique, a user applies the disaster recovery plan to the virtual machine. An agent backs up the virtual machine to the cloud environment based upon the disaster recovery plan. Boot virtual machine disks in the VMDK format are copied from S3 storage to an EBS volume using AWS import. The data virtual machine disks are restored on-demand from the S3 storage to the cloud storage operating system without copying data. That is, the data virtual machine disks are converted from the VMDK format to LUNs that are connected using iSCSI sessions to EC2 instances hosting the destination virtual machines within the cloud environment. Data protection in the cloud environment is provided using incremental local snapshots in the cloud storage operating system, which are backed up to the S3 storage as incremental data virtual machine disk backups. Boot volumes use EBS volume snapshots in the S3 storage. In this way, copy free conversion of the data virtual machine disks between different formats is provided through the cloud storage operating system.

In some embodiments, disaster recovery failover is provided using a cloud storage operating system/storage operating system select data store in a VMWare Cloud (VMC). A disaster recovery plan is based upon a policy where a user chooses an RPO (hourly, daily, weekly), select virtual machine names, cloud VPC/subnet/security groups, and other settings as part of disaster recovery. In order to support end to end disaster recovery in the VMC hosted in AWS, the cloud storage operating system/storage operating system select is used to enable copy free conversion of virtual machine disks. The virtual machine disks are not converted between difference formats since the virtual machine format used by the primary virtual machine and the destination virtual machine are the same. In some embodiments of this technique, disaster recovery failover using the cloud storage operating system in VMC is implemented where virtual machine disks are restored on-demand from the S3 storage to the cloud storage operating system. A VM datastore (e.g., a datastore in a virtual environment used as storage for a virtual inventory such as to store virtual machine files, log files, virtual disks, and ISO images) for the restored virtual machine disks is mounted natively in the VMC from the cloud storage operating system. An agent registers the destination virtual machine during failover without copying virtual machine disk data. The agent takes local cloud storage operating system incremental snapshots that are backed up to the S3 storage. In some embodiments, disaster recovery restore operation is performed using the using the cloud storage operating system in VMC. Virtual machine disks are restored on-demand from the S3 storage to the cloud storage operating system. The agent is used to restore the virtual machines to VMC VSAN data store (e.g., a storage platform for VMware Cloud on AWS). In some embodiments, a VM agent performs an incremental virtual machine backup to the cloud storage operating system, which can be backed up to the S3 storage using copy to cloud functionality. In some embodiments, storage operating system storage (e.g., on-premise storage such as an on-premise volume) may be directly exposed to VMC for backing up and/or transferring data.

Figure 7A:
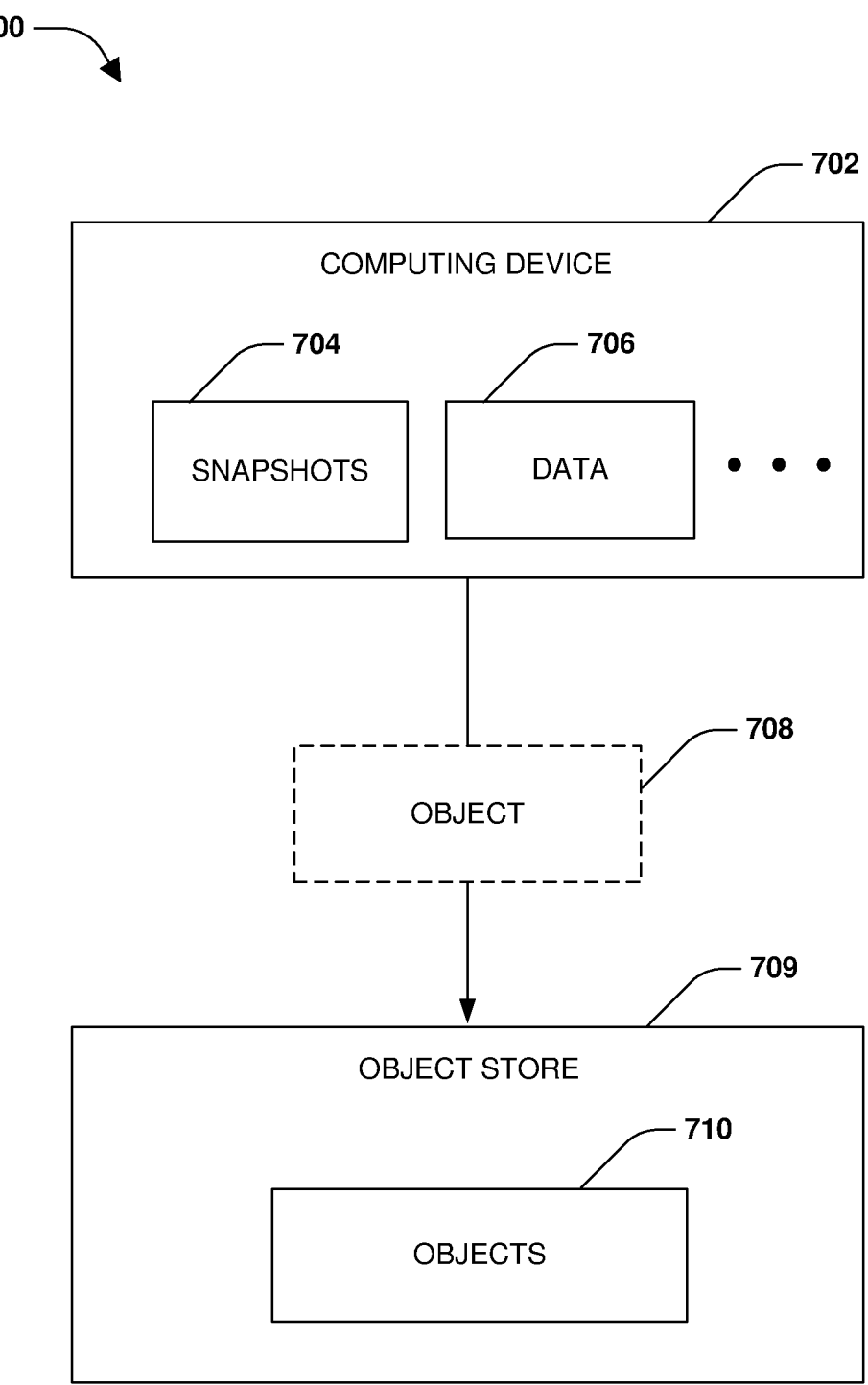
FIG. 7A is a component block diagram illustrating an example system for managing objects within an object store using an object file system, where snapshot data of a snapshot of a primary virtual machine is stored within the objects.

FIG. 7A illustrates a system 700 for managing objects within an object store (a remote object store) using an object file system. The objects may store backup data of snapshots that can be restored on-demand to an on-demand volume using a restore process (e.g., an on-demand restore operation) such that clients are provided with access to the backup data during and before completion of the restore process. The objects may store snapshot data of a snapshot of a primary virtual machine, which may be used to restore the primary virtual machine as a destination virtual machine. A computing device 702 may comprise a node, a storage controller, a storage service, an on-premises computing device, a storage virtual machine, or any other hardware or software. The computing device 702 may store data 706 within storage devices (primary storage) managed by the computing device 702. The computing device 702 may provide client devices with access to the data 706, such as by processing read and write operations from the client devices. The computing device 702 may create snapshots 704 of the data 706, such as a snapshot of a file system of a volume accessible to the client devices through the computing device 702. The computing device 702 may be configured to communicate with an object store 709 over a network. The object store 709 may comprise a cloud storage environment remote to the computing device 702.

As provided herein, an object file system and object format is provided for storing and accessing data, such as snapshots, stored within objects in the object store 709. The data 706, maintained by the computing device, is stored into a plurality of slots of an object 708. Each slot represents a base unit of data of the object file system defined for the object store 709. For example, the object 708 comprises or any other number of slots (e.g., 1024 slots), wherein each slot comprises 7 kb of data or any other amount of data. It may be appreciated that objects may comprise any number of slots of any size. User data, directory blocks, metadata, and/or inofile blocks of an inofile comprising per inode metadata is stored into the slots of the object 708. In an example, snapshot data, of a snapshot created by the computing device 702 of a file system maintained by the computing device 702, is stored into the object 708. For example, the object 708 may be maintained as an independent logical representation of the snapshot, such that data of the snapshot is accessible through the object 708 without having to reference other logical copies of other snapshots stored within objects 710 of the object store 709. In an example, the data is converted from physical data into a version independent format for storage within the object 708.

In an example, the object 708 is created to comprise data in a compressed state corresponding to compression of the data within the primary storage of the computing device 702. In this way, compression used by the computing device 702 to store the data is retained within the object 708 for storage within the object store 709. The object 708 may be assigned a unique sequence number. Each object within the object store 709 is assigned unique sequence numbers.

An object header may be created for the object 708. The object header comprises a slot context for slots within the object 708. The slot context may comprise information relating to a type of compression used for compressing data within the object 708 (if any compression is used), a start offset of a slot, a logical data length, a compressed data length, etc. The slot context may be used to access compressed data stored within the object 708.

Figure 7B:
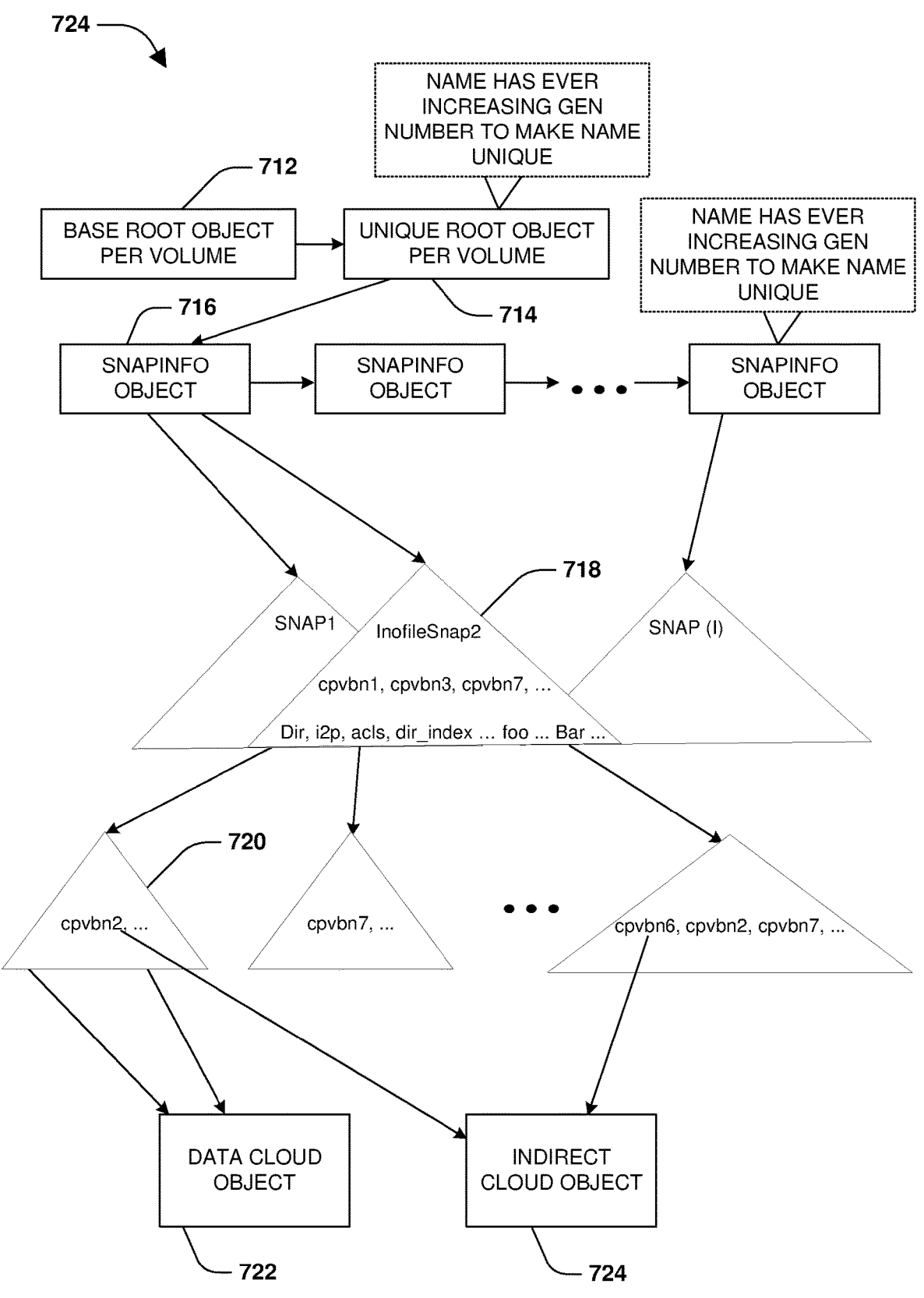
FIG. 7B is an example of a snapshot file system within an object store, where the snapshot file system is for a snapshot of a primary virtual machine.
Figure 7C:
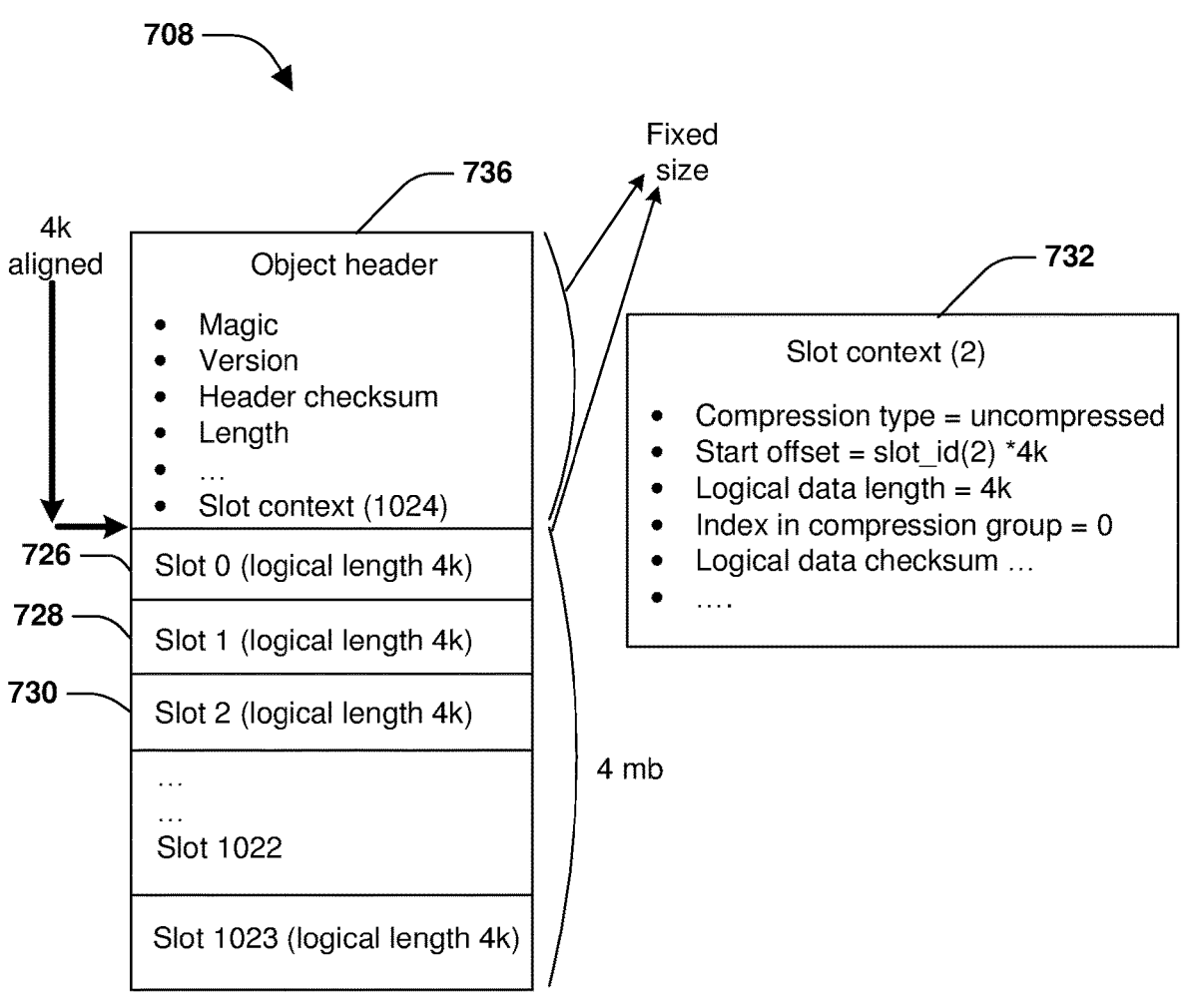
FIG. 7C is an example of an object stored within an object store, where snapshot data of a snapshot of a primary virtual machine is stored within the object.

FIG. 7C illustrates an example of the object 708. The object 708 comprises an object header 736 and a plurality of slots, such as a slot 726, a slot 728, a slot 730, and/or any other number of slots. The object header 736 may have a size that is aligned with a start of the plurality of slots, such as having a 7 kb alignment based upon each slot having a logical length of 7 kb. It may be appreciated that slots may have any length. The object header 736 comprises various information, such as a version identifier, a header checksum, a length of the object 708, a slot context 732, and/or other information used to access and manage data populated into the slots of the object 708. The object may store snapshot data of a snapshot of a primary virtual machine, which may be used to restore the primary virtual machine as a destination virtual machine The slot context 732 comprises various information about the slots, such as a compression type of a slot (e.g., a type of compression used to compress data of slots into a compression group or an indicator that the slot does not comprise compressed data), a start offset of the slot within the object 708 (e.g., a slot identifier multiplied by a slot size, such as 7 kb), a logical data length of the slot (e.g., 7 kb), a compressed length (e.g., 0 if uncompressed), an index of the slot within a compression group of multiple slots (e.g., 0 if uncompressed), a logical data checksum, etc.

The data stored within the slots of the object 708 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 708 and/or a slot number of a slot comprising a portion of the data represented by the node. User data, directory blocks, metadata, inofile blocks of an inofile, and/or other data stored within the slots of the object 708 may be represented by nodes within the data structure. In an example, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In an example of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 7B illustrates a snapshot file system of data structures 724 (e.g., a tree structure that can be traversed by a data connector component) used to represent snapshots (e.g., snapshots of one or more volumes managed by the computing device 702) stored into the objects 710 of the object store 709. The snapshot file system may be for a snapshot of a primary virtual machine, which may be used to restore the primary virtual machine as a destination virtual machine. There is one base root object per volume, such as a base root object 712 for a volume of which the snapshots were captured. There is a unique root object per volume, such as a unique root object 714 for the volume. The base root object

712 may point to the unique root object 714. Names of the unique root objects may be derived from increasing generation numbers. The unique root object 714 may point to snapinfo objects, such as a snapinfo object 716 comprising information regarding one or more snapshots, such as a pointer to an inofile 718 of a second snapshot of the volume. The inofile 718 comprises cloud block numbers of slots within an object comprising data of the second snapshot, such as a pointer to an indirect 720 that points to data of the snapshot (e.g., a data cloud object 722) and/or could point to an indirect cloud object 724. The inofile 718 may comprise or point to information relating to directories, access control lists, and/or other information.

A mapping metafile (a VMAP) is maintained for the object 708. The mapping metafile maps block numbers of primary storage of the computing device 702 (e.g., virtual volume block numbers of the data stored into slots of the object 708) to cloud block numbers of nodes representing portions of the data stored within the slots of the object 708. The object 708 is stored within the object store 709. In an example of storing objects into the object store 709, the plurality of snapshots 704, maintained by the computing device 702, are stored within objects 710 of the object store 709. Each snapshot is identifiable through a snapinfo object that has a unique generation number. As will be described later, the objects 710 within the object store 709 may be deduplicated with respect to one another (e.g., the object 708 is deduplicated with respect to the object 710 using the mapping metafile as part of being stored into the object store 709) and retain compression used by the computing device 702 for storing the snapshots 704 within the primary storage.

The mapping metafile and/or the data structure are used to provide access through the object file system to portions of data within the slots of the object 708 in the object store 709. In an example, the inode object and the data structure are traversed to identify a sequence number and slot number of requested data. The sequence number and the slot number are used to access the requested data within a corresponding slot of the object 708. In an example, a read request targets a 100,000$^{th}$ level 0 block stored within the object 708. The inode object is read to calculate which blocks in each level of the data structure will have 100,000 (e.g., 100,000/255 is a 493$^{th}$ block in level 1 and 493/255 is a 2nd block in level 2). These blocks are read at each level to go to a next level through appropriate pointers (e.g., cloud block numbers) until the data is read from a block of user data within the level 0. The pointers are cloud block numbers, where a pointer comprises a sequence number of the object 708 and a slot number. The sequence number corresponds to an object name of the object 708 and the slot number is which slot the data is located within the object 708.

In an embodiment, an on-demand restore of data within a snapshot stored within objects of the object store 709 can be performed to a target computing device using the mapping metafile and/or the data structure. In an embodiment, the mapping metafile and/or the data structure may be used to free objects from the object store 709 based upon the objects comprising snapshot data of snapshots deleted by the computing device 702.

In an embodiment, the mapping metafile and/or an overflow mapping metafile are used to facilitate the copying of the snapshots to the object store 709 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 704 maintained by the computing device 702 and copied into the objects 710 of the object store 709 as copied snapshots. An entry within the mapping metafile is populated with a mapping between a block number of data within a snapshot at the computing device 702 (e.g., a virtual volume block number) and a cloud block number (e.g., a cloud physical volume block number) of a slot within an object into which the data was copied when the snapshot was copied to the object store 709 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 702 within the primary storage, which are copied to the object store as copied snapshots). In an example, the block numbers may correspond to virtual volume block numbers of data of the snapshots stored by the computing device 702 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 702.

The mapping metafile and/or the overflow mapping metafile is used to determine what data of the current snapshot is to be copied to the object store 709 and what data already exists within the object store 709 so that only data not already within the object store 709 is transmitted to the object store 709 for storage within an object. Upon determining that the current snapshot is to be copied to the object store 709, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 709 and a prior copied snapshot already copied from the primary storage to the object store 709 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 709.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 709 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 709. Once the object is stored within the object store 709, the mapping metafile and/or the overflow mapping metafile is updated with entries for the deduplicated set of changed block numbers based upon receiving an acknowledgment of the object being stored by the object store 709. An entry will map a changed block number to a cloud block number of a slot within which data of the changed block number is stored in the object.

In an embodiment, the object file system is used to provide various primary storage system services for the object store 709 in order to achieve efficient space and resource management, and flexible scaling in the object store 709 (e.g., a cloud storage environment). Additionally, pseudo read only snapshots are provided through the object store 709. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 702). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 709, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 702, to the object store 709 such as cloud services within the cloud storage environment.

In one embodiment, objects within the object store 709 (e.g., objects within a cloud storage environment) can be maintained with a read only attribute such that data within objects can be overwritten/modified/freed so long as in-use data within the objects is not altered. In particular, an object may be maintained within the object store 709, such as a cloud storage environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 702 is storing data of a snapshot of a local file system within a slot of an object, and thus the snapshot data is in-use until a particular event occurs such as the computing device 702 deleting the snapshot). In an example, the object comprises snapshot data of a file system, a volume, a logical unit number (LUN), a file, or any other data of the computing device 702. In this way, the object comprises a read only snapshot of data of the computing device 702. In one example, a plurality of objects corresponding to read only snapshots of the file system of the computing device 702 are stored within the object store 709. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 702 (a primary storage system). For example, an in-use slot may be a slot that comprises snapshot data (e.g., secondary/replicated data) of a snapshot created by a computing device 702. The slot becomes an unused slot when the data is no longer actively referenced, used, and/or maintained, such as where the computing device 702 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud storage environment. This will offload processing and resource utilization that would otherwise be used by the computing device 702 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 702. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 709. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 702. The snapshot may be determined as being deleted by the computing device 702, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g., free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 702 (primary storage system) otherwise used to execute the garbage collection operation. The garbage collection operation free objects from the object store 709 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 709 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 709. However, if the object is not unique to only deleted snapshot(s) such as where the object also stores data of an active/undeleted snapshot, then the object is not freed.

In an embodiment, defragmentation is provided for fragmented objects within the object store 709. In an example, defragmentation is implemented by a cloud service or application executing in the object store 709 in order to conserve resources otherwise used by a computing device 702 (primary storage system) that would execute defragmentation functionality. An object within the object store 709 is determined to be a fragmented object based upon the object comprising at least one freed slot from which data was freed. For example, a freed slot may comprise an unused slot comprising unused data no longer referenced/used by the computing device 702 (e.g., data of a deleted snapshot). Accordingly, the fragmented object may comprise one or more in-use slots of in-use data currently referenced/used by a computing device 702 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 709.

The present system preserves deduplication and compression used by the computing device 702 for snapshots when storing copied snapshots to the object store 709 notwithstanding copied snapshots representing fully logical copies of data in the primary storage of the computing device 702. In particular, deduplication is preserved because data that is shared in a snapshot (e.g., a local or primary snapshot created and maintain by the node) is also shared in a copied snapshot in the object store 709. Deduplication of compression groups is maintained while logically representing the compression groups in a copied snapshot. Block sharing across multiple snapshots is also preserved so that merely changed blocks are transferred/copied to the object store 709 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 702 of the storage system since access to the primary storage of the computing device 702 may be more read intensive, and thus read efficiency is prioritized over storage space efficiency. Because copied snapshots in the object store 709 are infrequently accessed (e.g., cold data that is infrequently read), relatively larger compression groups can be employed for improved storage space efficiency within the object store, which also reduces network bandwidth for snapshot copying to the object store 709.

In one embodiment, snapshots maintained by the computing device 702 are copied to the object store 709 as copied snapshots representing logical data of the snapshots. Data of the copied snapshots is stored into slots of objects that are deduplicated with respect to other objects stored within the object store 709 and retain compression used by the computing device 702 for the snapshots.

In an example, the computing device 702 stores data within primary storage. The computing device 702 may create snapshots of the data stored by the computing device 702. For example, the computing device 702 may create a snapshot of a file, a logical unit number, a directory, a volume, a storage virtual machine hosting a plurality of volumes, a file system, a consistency group of any arbitrary grouping of files, directories, or data, etc. The computing device 702 may deduplicate data between the snapshots so that instead of storing redundant data blocks multiple times, merely references are stored in place of the redundant data blocks and point to original data blocks with the same data.

The computing device 702 may compress data within the snapshots, such as by creating compression groups of compressed data blocks.

The mapping metafile and/or the overflow mapping metafile is used to determine what data of the current snapshot is to be copied to the object store 709 and what data already exists within the object store so that only data not already within the object store is transmitted to the object store 709 for storage within an object. Upon determining that the current snapshot is to be copied to the object store, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 8:
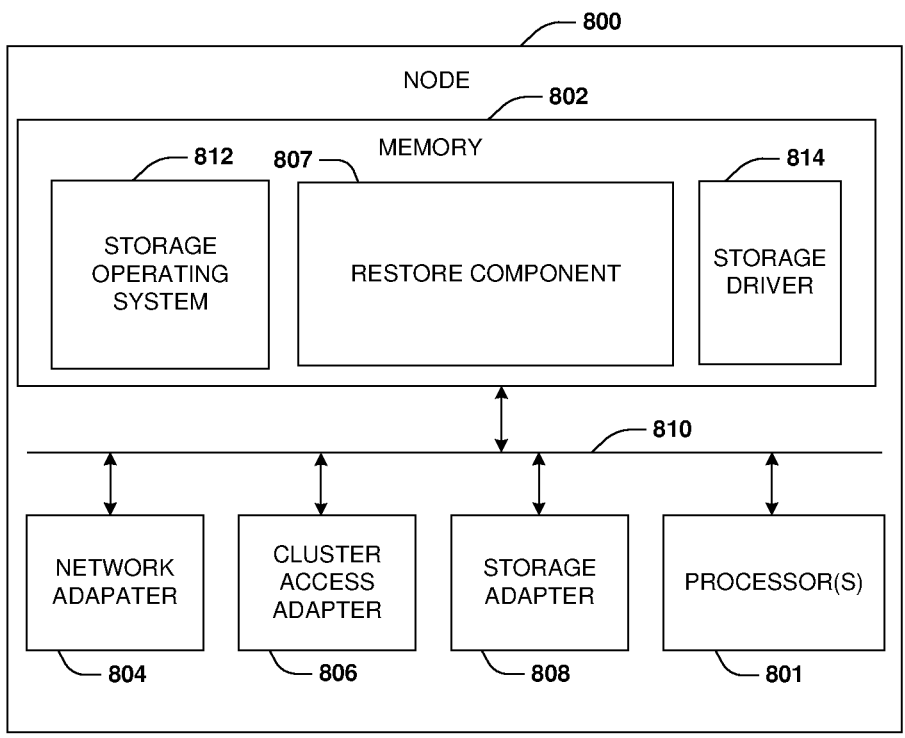
FIG. 8 is a block diagram illustrating an example of a node in accordance with an embodiment of the present technology.

FIG. 8 is a block diagram illustrating an example of a node in accordance with various embodiments of the present technology.

Referring to FIG. 8, a node 800 in this particular example includes processor(s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using TCP/IP) via a cluster fabric and/or another network (e.g., a WAN) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (ISCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

A file system module of the storage operating system 812 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein. For example, the storage operating system 812 can also utilize one or more control files (not shown) to aid in the provisioning of virtual machines.

In some embodiments, instructions of a restore component 807 may be stored within the memory 802 of the node 800 and executed by the processor(s) 801 in order to backup and restore virtual machines such as for disaster recovery.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
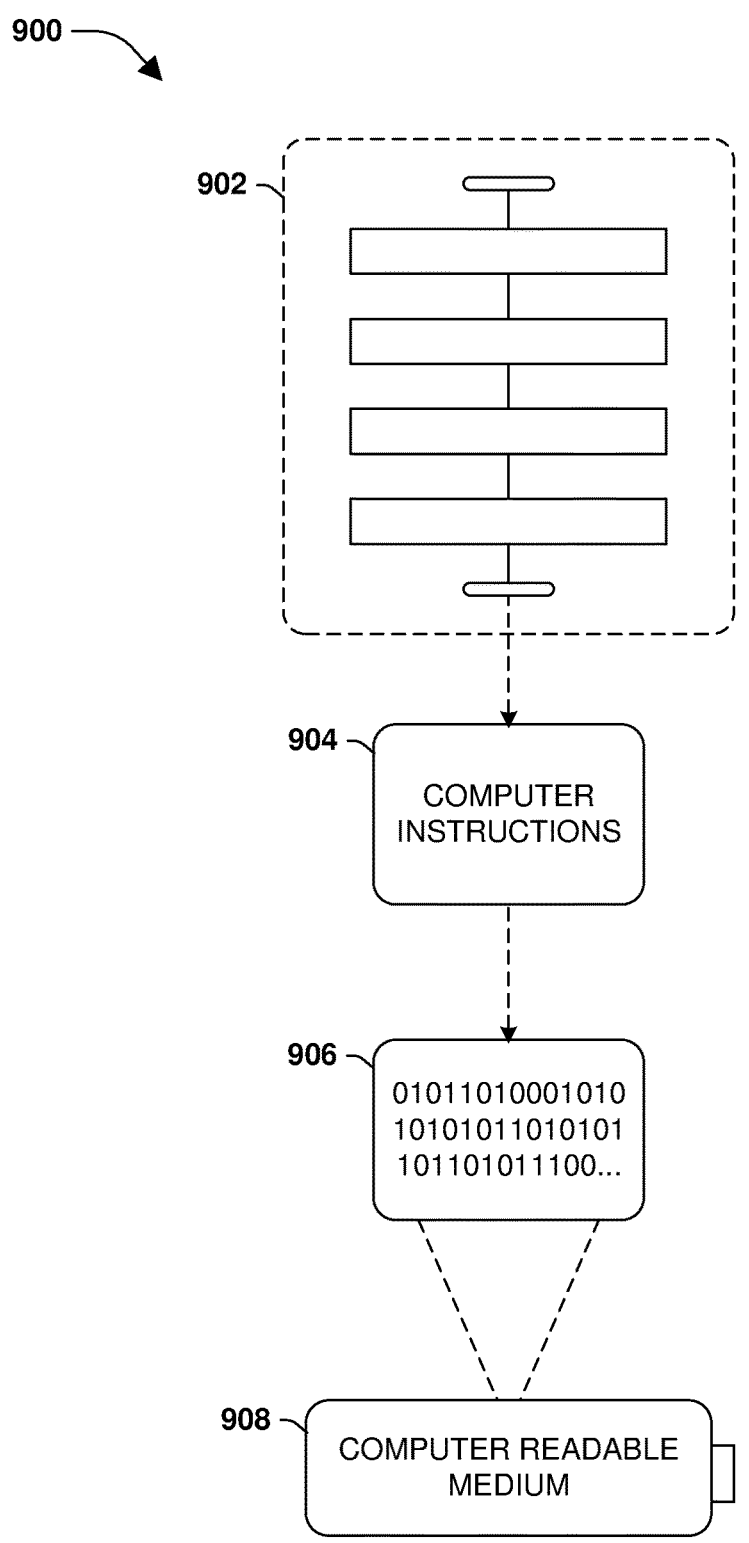
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium

908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 200 of FIG. 2, for example. In some embodiments, the processor-executable computer instructions 904 are configured to implement a system, such as at least some of the exemplary system 100 of FIG. 1, at least some of the exemplary system 300 of FIGS. 3A-3E, at least some of the exemplary system 400 of FIG. 4, at least some of the exemplary system 500 of FIG. 5, and/or at least some of the exemplary system 600 of FIG. 6, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

backing up snapshots, of a primary virtual machine hosted on-premise, to a storage bucket of a cloud storage environment as backup snapshots capturing states of a boot virtual machine disk and a data virtual machine disk of the primary virtual machine; and in response to a failure of the primary virtual machine, executing a disaster recovery orchestration process that includes:

creating a destination boot virtual machine disk from a backup snapshot of the primary virtual machine;

dynamically generating an instance of a destination virtual machine within the cloud storage environment using the destination boot virtual machine disk to boot the destination virtual machine; and implementing a restore operation, selected from a set of restore operations, to create a destination data virtual machine disk for the destination virtual machine using the backup snapshot, wherein during the restore operation, data is on-demand restored from the backup snapshot to the data virtual machine disk for access by an operation based upon a determination that the operation targets the data not yet restored to the data virtual machine disk.

2. The method of claim 1, comprising:

converting the destination data virtual machine disk into a logical unit number (LUN); and connecting the LUN to the destination virtual machine using an iSCSI session.

3. The method of claim 1, comprising:

mounting the destination data virtual machine disk from a cloud volume hosted within the cloud storage environment for access by the destination virtual machine.

4. The method of claim 1, comprising:

initializing the destination virtual machine for providing access to data within the destination data virtual machine disk and for hosting applications previously hosted by the primary virtual machine.

5. The method of claim 1, comprising:

during failover operation of the destination virtual machine, storing incremental snapshots of the destination virtual machine into the storage bucket, wherein the incremental snapshots capture changes made to the destination data virtual disk by the destination virtual machine.

6. The method of claim 1, comprising:

in response to determining that the primary virtual machine has recovered, executing a failback operation that includes:

utilizing an incremental snapshot, capturing changes made to the destination data virtual machine disk, to restore the data virtual machine disk and the boot virtual machine disk for use the primary virtual machine; and initializing the primary virtual machine using the restored boot virtual machine disk for providing access to the restored data virtual machine disk.

7. The method of claim 1, comprising:

in response to executing a failback operation for hosting the primary virtual machine using a restored boot virtual machine disk for providing access to a restore data virtual machine disk, deleting the destination virtual machine to free resources consumed by the destination virtual machine.

8. The method of claim 1, comprising:

in response to implementing a failback operation for rehosting the primary virtual machine using a restored boot virtual machine disk for providing access to a restore data virtual machine disk, establishing a backup relationship from the primary virtual machine to the storage bucket for creating and backing up snapshots of the primary virtual machine to the storage bucket.

9. The method of claim 1, wherein the set of restore operations include a directory restore operation, a full volume restore operation, and an on-demand restore operation.

10. The method of claim 1, wherein the implementing the restore operation comprises:

creating an on-demand volume into which data of the data virtual machine disk captured by the backup snapshot is to be restored; and providing the destination virtual machine with access to the on-demand volume before the data of the data virtual machine disk has been fully restored, wherein the providing comprises:

in response to receiving a first operation targeting first data already restored to the data virtual machine disk, executing the first operation upon the first data; and in response to receiving a second operation targeting second data not yet restored to the data virtual machine disk:

on-demand restoring the second data from the backup snapshot to the data virtual machine disk; and executing the second operation upon the second data restored to the data virtual machine disk.

11. The method of claim 1, wherein the disaster recovery orchestration process comprises:

converting the backup snapshot from a backup format, used by a cloud backup process to back up the backup snapshot to the storage bucket, to a virtual machine disk format.

12. The method of claim 1, wherein the selecting comprises:

selecting, based upon a destination performance profile, the restore operation from the set of restore operations to create the destination data virtual machine disk.

13. The method of claim 1, wherein the selecting comprises:

selecting the restore operation from the set of restore operations to perform based upon an acceptable client delay.

14. A computing device comprising:

a memory comprising instructions; and a processor coupled to the memory, the processor configured to execute the instructions to cause the processor to perform operations comprising:

backup snapshots, of a primary virtual machine hosted on-premise, to a storage bucket of a cloud storage environment as backup snapshots capturing states of a boot virtual machine disk and a data virtual machine disk of the primary virtual machine; and in response to a request to host a new instance of the primary virtual machine within the cloud storage environment, triggering an orchestration process that includes:

creating a destination boot virtual machine disk from a backup snapshot of the primary virtual machine;

dynamically generating an instance of a destination virtual machine on-demand within the cloud storage environment using the destination boot virtual machine disk to boot the destination virtual machine; and implementing a restore operation, selected from a set of restore operations, to create a destination data virtual machine disk for use by the destination virtual machine using the backup snapshot, wherein during the restore operation, data is on-demand restored from the backup snapshot to the data virtual machine disk for access by an operation based upon a determination that the operation targets the data not yet restored to the data virtual machine disk.

15. The computing device of claim 14, wherein the operations comprise:

providing development testing access to the destination virtual machine hosted within the cloud storage environment, wherein the development testing access does not modify the primary virtual machine.

16. The computing device of claim 15, wherein the operations comprise:

performing read load distribution to distribute read operations amongst the primary virtual machine and the destination virtual machine.

17. The computing device of claim 15, comprising:

a scale-out data access layer configured to deploy a plurality of scale-up onto systems over scale-out cloud storage of the cloud storage environment, wherein the plurality of scale-up onto systems host instances of the destination virtual machine.

18. A non-transitory machine readable medium comprising instructions for performing a method, which when executed by a machine, causes the machine to perform operations comprising:

creating backing up snapshots, of a primary virtual machine hosted on-premise, to a storage bucket of a cloud storage environment as backup snapshots capturing states of a boot virtual machine disk and a data virtual machine disk of the primary virtual machine; and in response to a request to host a new instance of the primary virtual machine within the cloud storage environment, triggering an orchestration process that includes:

creating a destination boot virtual machine disk from a backup snapshot of the primary virtual machine;

dynamically generating an instance of a destination virtual machine within the cloud storage environment using the destination boot virtual machine disk to boot the destination virtual machine; and implementing a restore operation, selected from a set of restore operations, to create a destination data virtual machine disk for the destination virtual machine using the backup snapshot, wherein during the restore operation, data is on-demand restored from the backup snapshot to the data virtual machine disk for access by an operation based upon a determination that the operation targets the data not yet restored to the data virtual machine disk.

19. The non-transitory machine readable medium of claim 18, wherein the operations comprise:

providing development testing access to the destination virtual machine hosted within the cloud storage environment, wherein the development testing access does not modify the primary virtual machine.

20. The non-transitory machine readable medium of claim 18, wherein the operations comprise:

performing read load distribution to distribute read operations amongst the primary virtual machine and the destination virtual machine.

* * * * *